United States Patent
Takahata et al.

(10) Patent No.: US 10,266,097 B2
(45) Date of Patent: Apr. 23, 2019

(54) TRAVELING VEHICLE AND METHOD OF CONTROLLING THE TRAVELING VEHICLE

(71) Applicants: TOYOTA JIDOSHA KABUSHIKI KAISHA, Toyota-shi (JP); The University of Tokyo, Bunkyo-ku (JP)

(72) Inventors: Tomoyuki Takahata, Bunkyo-ku (JP); Masaru Ishikawa, Bunkyo-ku (JP); Yoshiyuki Senba, Toyota (JP); Takashi Izuo, Toyota (JP); Yusuke Kosaka, Chofu (JP)

(73) Assignees: TOYOTA JIDOSHA KABUSHIKI KAISHA, Toyota-shi (JP); The University of Tokyo, Bunkyo-ku (JP)

( * ) Notice: Subject to any disclaimer, the term of this patent is extended or adjusted under 35 U.S.C. 154(b) by 0 days.

(21) Appl. No.: 15/836,996

(22) Filed: Dec. 11, 2017

(65) Prior Publication Data
US 2018/0178706 A1   Jun. 28, 2018

(30) Foreign Application Priority Data

Dec. 26, 2016   (JP) ................. 2016-250785

(51) Int. Cl.
| | | |
|---|---|---|
| *B62B 5/02* | (2006.01) | |
| *A61G 5/04* | (2013.01) | |
| *B60P 3/42* | (2006.01) | |
| *A61G 5/06* | (2006.01) | |
| *B66B 29/08* | (2006.01) | |
| *G05D 1/02* | (2006.01) | |
| *B66B 21/04* | (2006.01) | |
| *G07C 5/00* | (2006.01) | |

(52) U.S. Cl.
CPC ............. *B60P 3/423* (2013.01); *A61G 5/042* (2013.01); *A61G 5/061* (2013.01); *B66B 29/08* (2013.01); *G05D 1/024* (2013.01); *G05D 1/0289* (2013.01); *A61G 2203/36* (2013.01); *A61G 2203/38* (2013.01); *A61G 2203/42* (2013.01); *B66B 21/04* (2013.01); *G07C 5/008* (2013.01)

(58) Field of Classification Search
CPC ................................... B62B 5/02; A61G 5/04
USPC ...... 198/312, 321; 280/5.2, 5.26, 250.1, 304, 280/DIG. 10; 180/8.2, 907
See application file for complete search history.

(56) References Cited

U.S. PATENT DOCUMENTS 4,898,256 A * 2/1990 Lehner ............... A61G 5/061
                                                180/8.2
4,915,184 A * 4/1990 Watkins .............. A61G 5/061
                                                180/8.2

(Continued)

FOREIGN PATENT DOCUMENTS

JP      10-314235       12/1998
WO   WO 2016/006248 A1   1/2016

*Primary Examiner* — Douglas A Hess
(74) *Attorney, Agent, or Firm* — Oblon, McClelland, Maier & Neustadt, L.L.P.

(57) ABSTRACT

When a vehicle body is on board an escalator, a control device makes an ejection determination by use of an external sensor. The control device makes an ejection determination by use of front-wheel rotation sensors. The control device makes an ejection determination by use of an inclination detecting unit. The control device switches a control mode from a boarding control mode to an ejection control mode, when at least one of the above three ejection determinations is affirmatively made.

4 Claims, 20 Drawing Sheets

(56) References Cited

U.S. PATENT DOCUMENTS

| | | | | |
|---|---|---|---|---|
| 5,423,563 | A | * | 6/1995 | Wild .................... A61G 5/061 |
| | | | | 280/250.1 |
| 5,996,767 | A | * | 12/1999 | Misawa ............... B66B 31/006 |
| | | | | 180/8.2 |
| 6,443,251 | B1 | * | 9/2002 | Morrell .................... A61G 5/04 |
| | | | | 180/65.8 |
| 6,619,414 | B2 | * | 9/2003 | Rau .................... B62D 55/075 |
| | | | | 180/9.1 |
| 6,857,490 | B2 | * | 2/2005 | Quigg ................... A61G 5/061 |
| | | | | 180/9.28 |
| 7,316,405 | B2 | * | 1/2008 | Kritman ................ A61G 5/061 |
| | | | | 180/326 |
| 7,384,046 | B2 | * | 6/2008 | Le Masne De Chermont ........... |
| | | | | A61G 5/045 |
| | | | | 180/65.51 |
| 7,562,728 | B1 | * | 7/2009 | Voigt .................... A61G 5/045 |
| | | | | 180/22 |
| 8,061,460 | B2 | * | 11/2011 | Scheck ................. B62B 5/028 |
| | | | | 180/8.1 |
| 8,504,248 | B2 | * | 8/2013 | Taira ...................... A61G 5/04 |
| | | | | 701/49 |
| 8,565,982 | B2 | * | 10/2013 | Lofstrand ............... A61G 5/04 |
| | | | | 280/35 |
| 8,573,341 | B2 | * | 11/2013 | Fought .................. A61G 5/043 |
| | | | | 180/65.51 |
| 8,789,628 | B2 | * | 7/2014 | Swenson ............... A61G 5/066 |
| | | | | 180/6.5 |
| 9,278,036 | B2 | * | 3/2016 | Lee ....................... A61G 5/066 |
| 9,999,557 | B2 | * | 6/2018 | Diaz-Flores .......... A61G 5/023 |
| 10,137,042 | B2 | * | 11/2018 | Ishikawa ................ A61G 5/04 |
| 2017/0172823 | A1 | | 6/2017 | Ishikawa et al. |

* cited by examiner

TRAVELING VEHICLE AND METHOD OF CONTROLLING THE TRAVELING VEHICLE

INCORPORATION BY REFERENCE

The disclosure of Japanese Patent Application No. 2016-250785 filed on Dec. 26, 2016 including the specification, drawings and abstract is incorporated herein by reference in its entirety.

BACKGROUND

1. Technical Field

The disclosure relates to a traveling vehicle and a method of controlling the traveling vehicle, and in particular to a traveling vehicle capable of riding on an escalator, and a method of controlling the traveling vehicle.

2. Description of Related Art

A traveling vehicle, such as an electric wheelchair, capable of riding on an escalator has been developed. In connection with this technology, Japanese Patent Application Publication No. 10-314235 (JP 10-314235 A) discloses a traveling vehicle, such as a wheelchair, capable of proceeding into an escalator and ejecting from the escalator. The traveling vehicle described in JP 10-314235 A includes an inclination recognition device that detects change of an inclined state of a vehicle body, and a front-wheel ejection recognition device that recognizes ejection of front wheels from the escalator, by detecting change of the rotational speeds of the front wheels.

In a condition where the wheelchair described in JP 10-314235 A is on board the escalator, the front wheels and rear wheels are unable to rotate, due to front brakes and rear brakes. In this condition, the inclination recognition device detects change of inclination of the vehicle body from a condition where the vehicle body is inclined relative to the horizontal plane, toward a condition where the vehicle body lies in the horizontal plane, by retrieving data of an inclination or angle meter, thereby to recognize that the wheelchair has approached an end portion of the escalator. As a result, the front brakes are released, and the front wheels are brought into freely rotatable states. At this time, the rear wheels are still in non-rotatable states. In this condition, if the front wheels reach a floor, they move from a tread or step to the floor, and start rotating. The front-wheel ejection recognition device recognizes ejection of the front wheels from the escalator, by retrieving data of a revolution counter, and detecting a change (increase) of the number of revolutions of the front wheels from zero to a value corresponding to the moving speed of the escalator. After a lapse of a predetermined time from recognition of ejection of the front wheels from the escalator, the rear brakes are released, and the rear wheels are brought into rotatable states. In this manner, the wheelchair (traveling vehicle) according to JP 10-314235 A can eject from the escalator.

SUMMARY

The traveling vehicle according to JP 10-314235 A is adapted to eject from the escalator, using the inclination meter and the revolution indicator. However, if either of the inclination meter and the revolution counter becomes abnormal due to a failure or poor accuracy, it would be better that the traveling vehicle is able to eject from the escalator. More specifically, if the inclination meter becomes abnormal, it cannot be recognized that the inclination of the vehicle body becomes close to zero (horizontal), and therefore, the front wheels cannot be permitted to rotate. Accordingly, when the front wheels reach the floor (landing platform), the front wheels cannot smoothly move from the step or tread to the floor, and the front wheels may get stuck with the floor. Also, if the revolution counter becomes abnormal, rotation of the front wheels cannot be recognized even if the front wheels ride onto the floor and start rotating. Accordingly, the rear wheels cannot be permitted to rotate. Accordingly, when the rear wheels reach the floor, the rear wheels may get stuck with the floor. In the cases as described above, it would be better that the traveling vehicle is able to eject from the escalator.

It may be considered to additionally install a dedicated sensor for detecting the timing of ejection from the escalator, in order to deal with an abnormality in detecting means (sensors, etc.), such as the inclination meter and revolution counter. With this arrangement, even in the case where an abnormality occurs to one sensor, it is possible to detect the timing of ejection from the escalator, using the other sensor. However, the additional installation of the dedicated sensor may result in complicated structure of the traveling vehicle, due to complication of wiring, for example. Also, the additional installation of the dedicated sensor may induce increase of the amount of electric power consumed. Accordingly, it is desired to deal with an abnormality in sensors, without additionally installing any dedicated sensor.

This disclosure provides a traveling vehicle that is able to eject from an escalator even when an abnormality occurs to one detecting device, without additionally installing a dedicated sensor for detecting the timing of ejection from the escalator, and also provides a method of controlling the traveling vehicle.

A traveling vehicle according one aspect of the disclosure is capable of riding on an escalator, and includes a vehicle body having a drive wheel, a controller that controls movement of the vehicle body, and at least two of at least one first detecting device, a second detecting device, and a third detecting device, which are used when the controller controls movement of the vehicle body, or a plurality of types of first detecting devices as the above-indicated at least one first detecting device configured to detect different conditions of the drive wheel. The above-indicated at least one first detecting device is configured to detect a condition of the drive wheel, and the second detecting device is configured to detect a condition surrounding the vehicle body, while the third detecting device is configured to detect an inclination angle when the vehicle body is located at a place having a height difference. The inclination angle corresponds to the height difference. In the traveling vehicle, the controller is able to switch a control mode between a first control mode in which the drive wheel is controlled so as to be pressed against a riser of the escalator when the drive wheel rides on a tread of the escalator, and a second control mode in which the drive wheel is controlled so as to eject the vehicle body from the escalator. The controller uses at least two determinations of at least one first determination, a second determination, and a third determination, or at least two first determinations as the above-indicated at least one first determination, as ejection determinations on ejection from the escalator. The above-indicated at least one first determination is made by using the at least one first detecting device and determining that an amount of change of the condition of the drive wheel exceeds a predetermined amount of change, as the vehicle body approaches a landing platform of the escalator, and the riser is retracted relative to the tread, in a condition where the drive wheel rides on the tread in the first control mode. The second determination is made by using the second detecting device and determining that the vehicle body approaches the landing platform of the escalator, in the condition where the drive wheel rides on the tread in the first control mode. The third determination is made by using the third detecting device and determining that an inclination angle of the escalator becomes smaller than a predetermined inclination angle as the vehicle body approaches the landing platform of the escalator, in the condition where the drive wheel rides on the tread in the first control mode. The controller is configured to switch the control mode from the first control mode to the second control mode for control of the drive wheel, when any of at least two ejection determinations as the ejection determinations is affirmatively made, and it is determined that timing of ejection of the vehicle body from the escalator is reached.

Another aspect of the disclosure is concerned with a method of controlling a traveling vehicle capable of riding on an escalator. The traveling vehicle includes a vehicle body having a drive wheel, and at least two of at least one first detecting device, a second detecting device, and a third detecting device, which are used for controlling movement of the vehicle body, or a plurality of first detecting devices as the above-indicated at least one first detecting device configured to detect different conditions of the drive wheel. The above-indicated at least one first detecting device is configured to detect a condition of the drive wheel, and the second detecting device is configured to detect a condition surrounding the vehicle body, while the third detecting device is configured to detect an inclination angle when the vehicle body is located at a place having a height difference. The inclination angle corresponds to the height difference. The traveling vehicle is switchable between a first control mode in which the drive wheel is controlled so as to be pressed against a riser of the escalator when the drive wheel rides on a tread of the escalator, and a second control mode in which the drive wheel is controlled so as to eject the vehicle body from the escalator. The method includes using at least two determinations of at least one first determination, a second determination, and a third determination, or at least two first determinations as the above-indicated at least one first determination, as ejection determinations on ejection from the escalator. The at least one first determination is made by using the at least one first detecting device and determining that an amount of change of the condition of the drive wheel exceeds a predetermined amount of change, as the vehicle body approaches a landing platform of the escalator, and the riser is retracted relative to the tread, in a condition where the drive wheel rides on the tread in the first control mode. The second determination is made by using the second detecting device and determining that the vehicle body approaches the landing platform of the escalator, in the condition where the drive wheel rides on the tread in the first control mode. The third determination is made by using the third detecting device and determining that an inclination angle of the escalator becomes smaller than a predetermined inclination angle as the vehicle body approaches the landing platform of the escalator, in the condition where the drive wheel rides on the tread in the first control mode. The method also includes switching the traveling vehicle from the first control mode to the second control mode for control of the drive wheel, when any of at least two ejection determinations as the ejection determinations is affirmatively made, and it is determined that timing of ejection of the vehicle body from the escalator is reached.

With the traveling vehicle configured as described above, even when an abnormality occurs to a certain detecting device, and the detecting device cannot make a correct determination, the traveling vehicle is able to eject from the escalator in appropriate timing, using the remaining detecting device(s). Also, the detecting devices according to the disclosure are not dedicated sensors provided for determining the timing of ejection from the escalator, but are originally installed on the traveling vehicle as general detecting devices used for performing normal operation of the traveling vehicle. Accordingly, the traveling vehicle of the disclosure can use these detecting devices in common, for normal operation of the traveling vehicle, and detection of the timing of ejection from the escalator. Thus, even if an abnormality occurs to one detecting device, the traveling vehicle can eject from the escalator, without additionally installing a dedicated detector for detecting the timing of ejection from the escalator.

The controller may use at least three of a plurality of first determinations as the above-indicated at least one first determination, which are made by using a plurality of first detecting devices as the above-indicated at least one first detecting device, or at least three of the above-indicated at least one first determination, the second determination, and the third determination, as the ejection determinations on ejection from the escalator, and the controller may be configured to switch the control mode from the first control mode to the second control mode for control of the drive wheel, when more than half of the at least three ejection determinations are affirmatively made, and it is determined that the timing of ejection of the vehicle body from the escalator is reached. When it is determined in more than half of the determining tasks that the ejection timing is reached, the detecting devices involved in more than half of the determining tasks are unlikely to be abnormal or at fault; thus, the determinations made in more than half of the determining tasks are highly likely to be correct. Accordingly, the traveling vehicle of the disclosure is able to improve the reliability in determination of the timing of ejection from the escalator.

Also, the controller may use at least two of the first determination, the second determination, and the third determination, as the ejection determinations on ejection from the escalator, and the controller may be configured to switch the control mode from the first control mode to the second control mode for control of the drive wheel, when any of at least two ejection determinations as the ejection determinations are affirmatively made, and it is determined that the timing of ejection of the vehicle body from the escalator is reached. If the front wheels are strongly pressed against the riser when the drive wheels are pressed against the riser of the escalator in the first control mode, the front wheels may suddenly step forward when the riser is retracted. Accordingly, it is desirable that the drive wheels are not so strongly pressed against the riser of the escalator. As a result, the response of the first determination using the first detecting device is reduced. Accordingly, it is possible to improve the reliability in determination of the timing of ejection from the escalator, by making an ejection determination(s) using at least one of the second detecting device and the third detecting device, rather than using only the first detecting device(s).

According to this disclosure, it is possible to provide the traveling vehicle that is able to eject from the escalator even when an abnormality occurs to one detecting device, without additionally installing a dedicated sensor for detecting the timing of ejection from the escalator, and the method of controlling the traveling vehicle.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
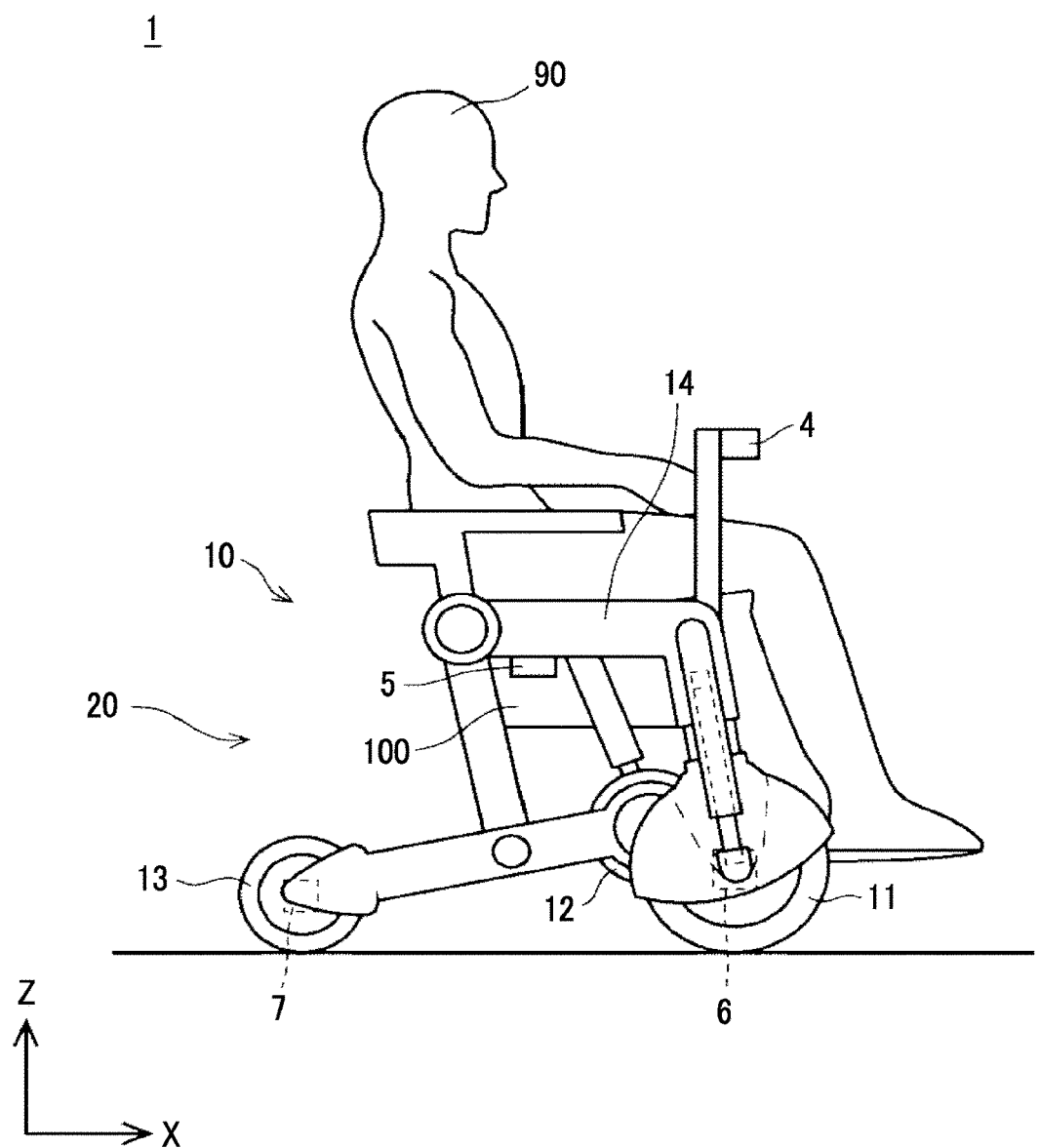
FIG. 1 is a side view showing a traveling vehicle according to embodiments.

Some embodiments of the disclosure will be described with reference to the drawings. It is, however, to be understood that the disclosure is not limited to the following embodiments. Also, the following description and the drawings are simplified as needed, for the sake of clarity of explanation. The same reference numerals are assigned to substantially the same constituent embodiments.

Figure 2:
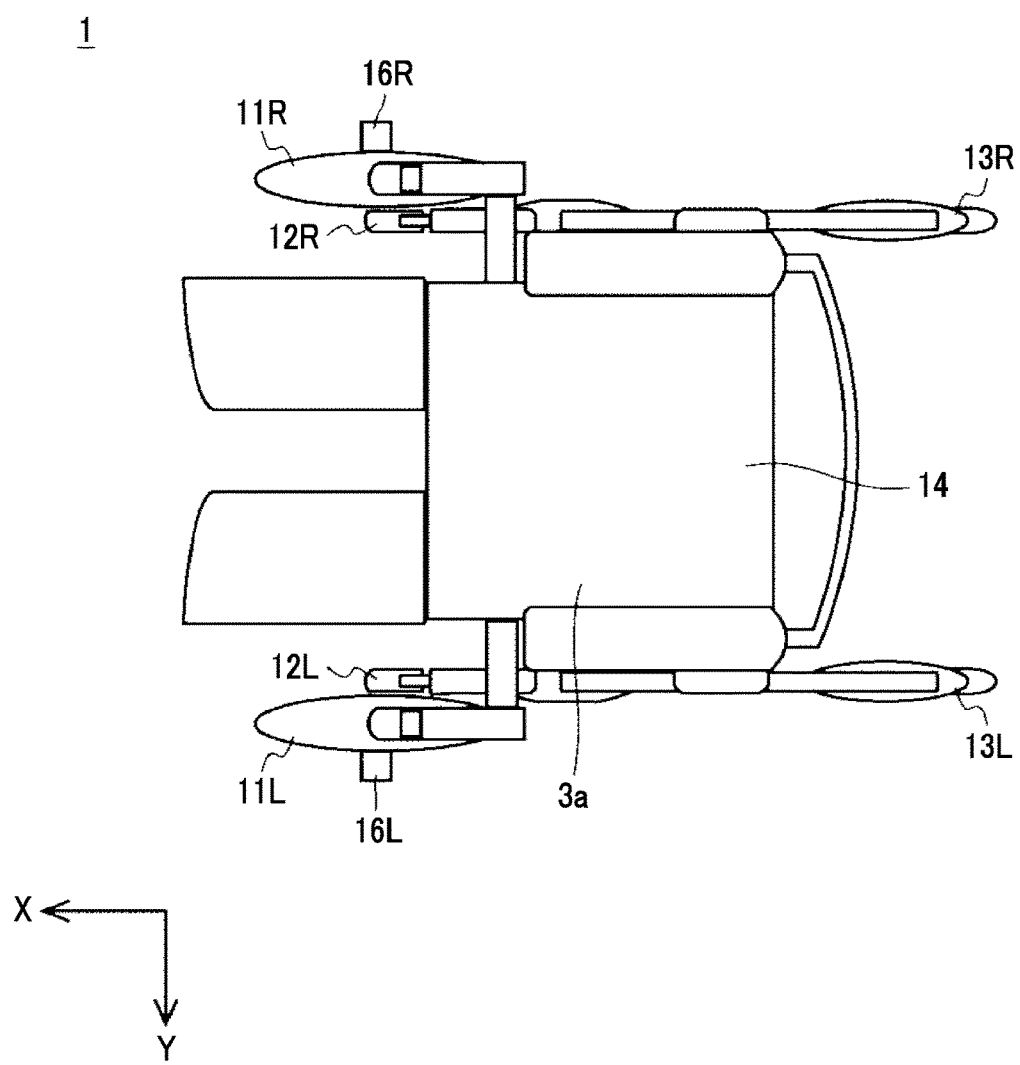
FIG. 2 is a top view showing the traveling vehicle according to the embodiments.

FIG. 1 is a side view showing a traveling vehicle 1 according to the embodiments. FIG. 2 is a top view showing the traveling vehicle 1 according to the embodiments. In FIG. 1 and FIG. 2, an X-Y-Z Cartesian coordinate system is used for explanation. In the coordinates system, +X direction denotes the front direction of the traveling vehicle 1, and −X direction denotes the rear direction of the traveling vehicle 1. Also, +Y direction denotes the left direction of the traveling vehicle 1, and −Y direction denotes the right direction of the traveling vehicle 1. Further, +Z direction denotes the vertically upward direction, and −Z direction denotes the vertically downward direction.

As shown in FIG. 1, the traveling vehicle 1 has a vehicle body 10, external sensor 4, attitude angle sensor 5, front-wheel rotation sensors 6, rear-wheel rotation sensors 7, and a control device 100. The vehicle body 10 has a seat 14 including a backrest and armrests, front wheels 11, middle wheels 12, rear wheels 13, and a variable mechanism 20.

The traveling vehicle 1 has laterally symmetrical configuration, and each pair of the front wheels 11, middle wheels 12, and the rear wheels 13 are provided on the right and left sides. Thus, in FIG. 2, the front wheel 11, middle wheel 12, and rear wheel 13 located on the left-hand side (+Y side) of the traveling vehicle 1 are denoted as front wheel 11L, middle wheel 12L, and rear wheel 13L, respectively. Similarly, in FIG. 2, the front wheel 11, middle wheel 12, and rear wheel 13 located on the right-hand side (−Y side) of the traveling vehicle 1 are denoted as front wheel 11R, middle wheel 12R, and rear wheel 13R, respectively. In the following description, L or R will not be attached to the reference numeral when the arrangements on the right and left sides are not particularly distinguished. The variable mechanism 20 also has a laterally symmetrical structure.

In the X direction, the middle wheels 12 are located between the front wheels 11 and the rear wheels 13. Namely, the front wheels 11 are located on the front side (+X side) of the middle wheels 12 and the rear wheels 13, and the rear wheels 13 are located on the back side (−X side) of the middle wheels 12 and the front wheels 11. The front wheels 11 are drive wheels, and rotate when they are driven by front-wheel drive motors 16. The front wheel 11L and the front wheel 11R are respectively connected to a front-wheel drive motor 16L and a front-wheel drive motor 16R as different motors, and can rotate independently of each other.

The middle wheels 12 and the rear wheels 13 are driven wheels, and rotate in accordance with movement of the traveling vehicle 1. Namely, when the traveling vehicle 1 is driven by the front wheels 11 and moves, the middle wheels 12 and the rear wheels 13 rotate, following the movement of the traveling vehicle 1.

For example, when the traveling vehicle 1 travels forward in a straight line, the front wheel 11L and the front wheel 11R rotate at the same rotational speed in the same rotational direction. When the traveling vehicle 1 travels while turning right or left, the front wheel 11L and the front wheel 11R rotate at different rotational speeds in the same rotational direction. When the traveling vehicle 1 revolves on the spot, the front wheel 11L and the front wheel 11R rotate at the same rotational speed in opposite directions. Thus, the left front wheel 11L and the right front wheel 11R are driven by different motors, so that the traveling vehicle 1 moves in a desired direction at a desired speed.

The seat 14 is a boarding section on which a person on board 90 is seated. As shown in FIG. 1, the traveling vehicle 1 moves in a condition where the person on board 90 is seated on the seat 14. The variable mechanism 20 is provided below the seat 14. The variable mechanism 20 is a leg mechanism that supports the seat 14. The front wheels 11, middle wheels 12, and the rear wheels 13 are rotatably attached to the variable mechanism 20. The variable mechanism 20 includes an arm mechanism capable of extending and contracting, and is operable to change the attitude of the seat 14 relative to the ground. In operation, the arm mechanism provided between the wheels and the seat 14 extends and contracts, so that the height or level and inclination of the seating surface of the seat 14 change. The detailed configuration of the variable mechanism 20 will be described later.

Further, as will be described later, movement of the variable mechanism 20 makes it possible for the traveling vehicle 1 to board and exit an elevator, and move over steps, while the person on board remains boarding on the seat 14. Accordingly, the traveling vehicle 1 can be used under various circumstances.

Each front-wheel rotation sensor 6 function as a detector (first detecting device) that detects a condition of the corresponding front wheel 11 as a drive wheel. The front-wheel rotation sensor 6 is provided in the vicinity of an axle of the front wheel 11. The front-wheel rotation sensor 6 may be a rotational speed sensor, such as a resolver, encoder, hall effect sensor, or an electromagnetic pickup, which detects the rotational speed of the front wheel 11, or a rotational angle sensor that detects the rotational angle of the front wheel 11. The front-wheel rotation sensor 6 may also be a rotation torque sensor that detects torque of the front-wheel drive motor 16, or a current sensor that detects a current value associated with the front-wheel drive motor 16, for example. Also, the front-wheel rotation sensor 6 is not limited to one sensor, but may consist of two or more different types of sensors. Namely, the front-wheel rotation sensor 6 (first detecting device) may consist of two or more sensors having different types of conditions to be detected. For example, the front-wheel rotation sensor 6 may consist of a rotational speed sensor and a rotation torque sensor.

Each rear-wheel rotation sensor 7 functions as a detector that detects a condition of the corresponding rear wheel 13. The rear-wheel rotation sensor 7 is provided in the vicinity of an axle of the rear wheel 13. The rear-wheel rotation sensor 7 may be a rotational speed sensor that detects the rotational speed of the rear wheel 13, or a rotational angle sensor that detects the rotational angle of the rear wheel 13, as described above.

The external sensor 4 function as a detector (second detecting device) that detects conditions surrounding the traveling vehicle 1. The external sensor 4 is attached to a front part of the seat 14, for example. The external sensor 4 is, for example, a camera, laser sensor, or an ultrasonic sensor, for example. In the following description, the external sensor 4 is supposed to be a camera.

The attitude angle sensor 5 detects the inclination of the seat 14 relative to a horizontal plane. The attitude angle sensor 5 is, for example, a gyroscope, an acceleration sensor, or the like. The attitude angle sensor 5 has a six-axis acceleration gyroscope sensor, for example, and detects accelerations on the X-axis, Y-axis, and Z-axis, and angular velocities about the X-axis, Y-axis, and Z-axis. The attitude angle sensor 5 is mounted in parallel with the seating surface of the seat 14. Accordingly, the attitude angle sensor 5 detects the angle of inclination of the seating surface.

Figure 3:
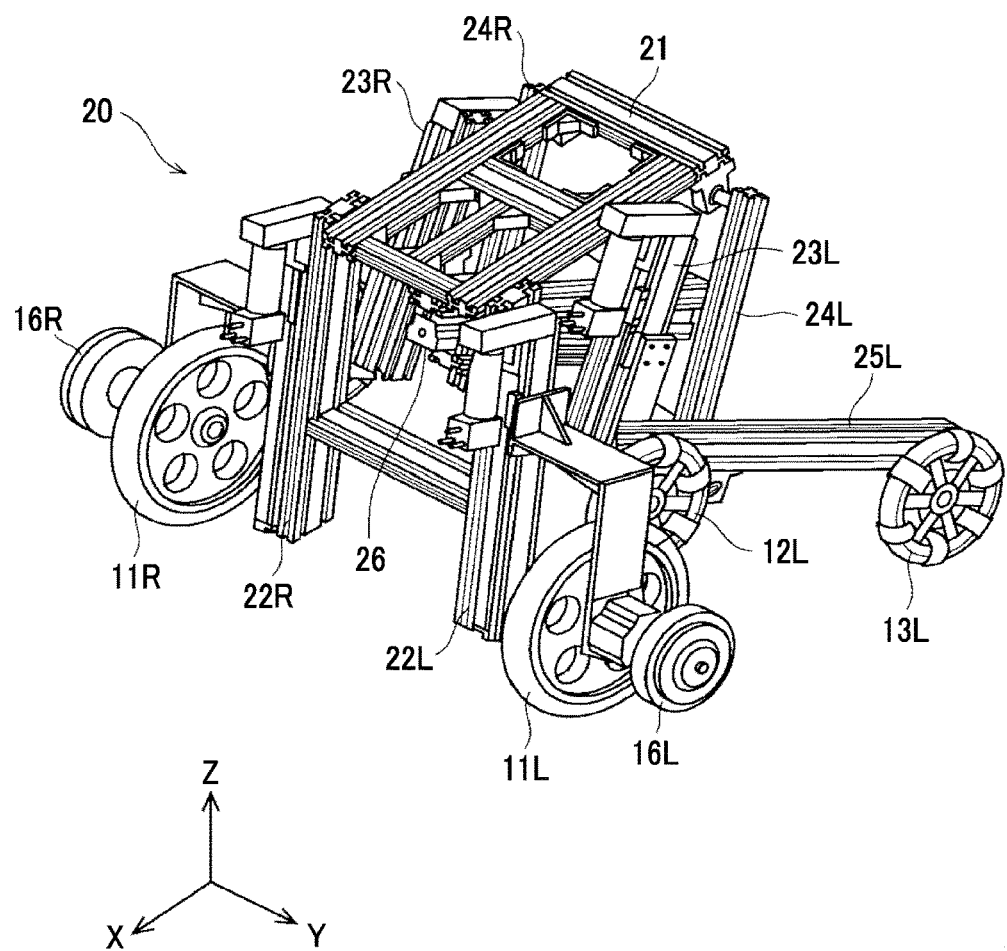
FIG. 3 is a perspective view showing the configuration of a variable mechanism.
Figure 4:
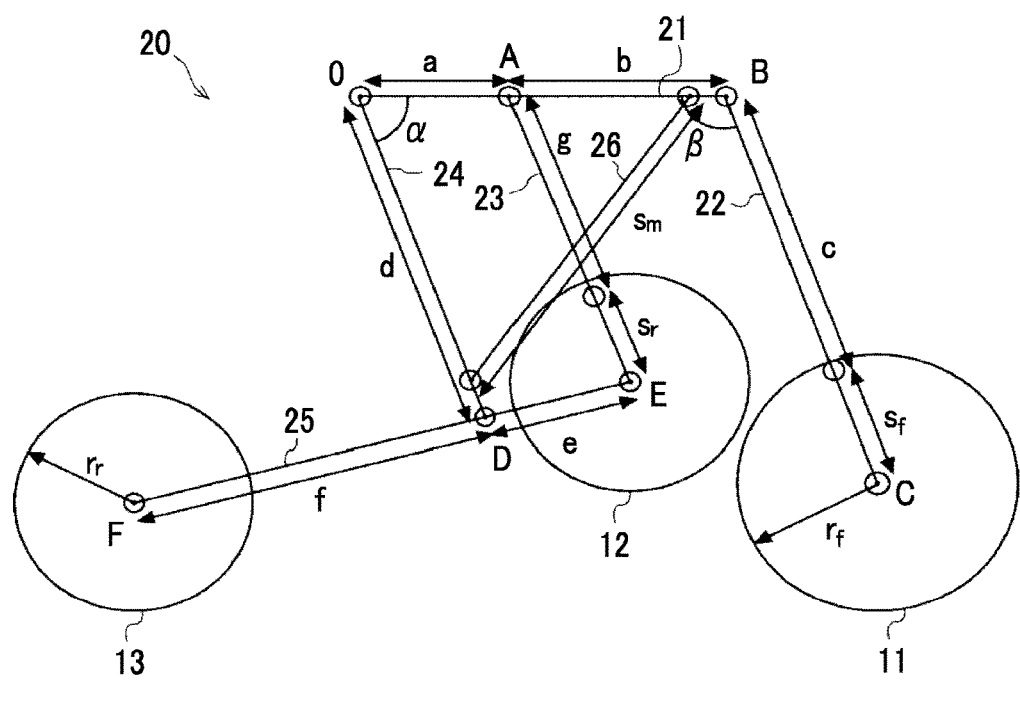
FIG. 4 is model diagram showing a model of the variable mechanism.

FIG. 3 is a perspective view showing the configuration of the variable mechanism 20. FIG. 4 is a model diagram showing a model of the variable mechanism 20. In FIG. 3 and FIG. 4, the seat 14, etc. are not illustrated. The variable mechanism 20 includes an upper frame 21, first linear motion mechanisms 22, second linear motion mechanisms 23, rear links 24, lower links 25, and a third linear motion mechanism 26.

The variable mechanism 20 has laterally symmetrical configuration. Similarly to the symmetrical configuration as described above, L or R is attached to the reference numeral of each constituent element of the symmetrical configuration. For example, the variable mechanism 20 includes two first linear motion mechanism 22L, 22R. The first linear motion mechanism 22L and the first linear motion mechanism 22R are located symmetrically. Similarly, the second linear motion mechanisms 23, rear links 24, and the lower links 25 are also located symmetrically, and L or R is attached to the reference numeral of each constituent element of the symmetrical configuration. Also, in FIG. 3, the lower link 25R, middle wheel 12R, and the rear wheel 13R are hidden by other constituent elements, because of the angle of the perspective view, but are located symmetrically with respect to the lower link 25L, middle wheel 12L, and the rear wheel 13L, respectively.

The seat 14, control device 100, etc. as described above are mounted on the upper frame 21. The seat 14 is mounted on the upper frame 21, to provide the boarding section. Accordingly, the attitude of the upper frame 21 corresponds to the attitude of the seat 14. The height of the seat 14 changes if the height of the upper frame 21 changes, and the angle of the seat 14 changes if the angle of the upper frame 21 changes. If the upper frame 21 is inclined forward, the seat 14 is also inclined forward. The upper frame 21 is in the form of a rectangular frame.

The first linear motion mechanisms 22 are attached to the opposite front ends of the upper frame 21. The first linear motion mechanisms 22 extend diagonally forward and downward. The front wheels 11 are attached to the lower ends of the first linear motion mechanisms 22. Namely, the front wheel 11L is rotatably attached to the first linear motion mechanism 22L, and the front wheel 11R is rotatably attached to the first linear motion mechanism 22R. Thus, the first linear motion mechanisms 22 couple the upper frame 21 with the front wheels 11. The mounting angle between the upper frame 21 and each first linear motion mechanism 22 is fixed to β.

Each of the first linear motion mechanisms 22 is, for example, an arm mechanism capable of extending and contracting. Namely, the length of the first linear motion mechanism 22 is variable. In the X-Z plane as shown in FIG. 4, the position of connection between the first linear motion mechanism 22 and the upper frame 21 is denoted as position B, and the position of connection between the first linear motion mechanism 22 and the front wheel 11 is denoted as position C. A shaft that passes the position C and parallels the Y axis provides the axle of the front wheel 11. The front wheel 11 rotates about the axle.

The rear links 24 are attached to the opposite rear ends of the upper frame 21. The rear links 24 extend downward from the upper frame 21. In the XZ plane as shown in FIG. 4, the position of connection between the upper frame 21 and each of the rear links 24 is denoted as position O. The angle α between the upper frame 21 and the rear link 24 is variable. Namely, the upper frame 21 and the rear link 24 are connected to each other via a passive joint. Thus, the upper end of the rear link 24 is rotatably coupled to the upper frame 21. The rear link 24 rotates about a rotational axis that passes the position O and parallels the Y-axis, relative to the upper frame 21.

The lower end of the rear link 24 is connected to the corresponding lower link 25. The rear link 24 couples the upper frame 21 with the lower link 25. The position of connection between the lower link 25 and the rear link 24 is denoted as position D. The angle formed by the lower link 25 and the rear link 24 is variable. Namely, at the position D, the lower link 25 and the rear link 24 are connected to each other via a passive joint. The lower link 25 rotates about a rotational axis that passes the position D and parallels the Y-axis, relative to the rear link 24.

The middle wheels 12 are attached to the front ends of the lower links 25. The rear wheels 13 are attached to the rear ends of the lower links 25. The middle wheel 12R is attached to the front end of the lower link 25R, and the rear wheel 13R is attached to the rear end of the lower link 25R. Similarly, the middle wheel 12L is rotatably attached to the front end of the lower link 25L, and the rear wheel 13L is rotatably attached to the rear end of the lower link 25L.

The position of connection between the lower link 25 and the middle wheel 12 is denoted as position E. The position of connection between the lower link 25 and the rear wheel 13 is denoted as position F. A shaft that passes the position E and parallels the Y-axis provides an axle of the middle wheel 12, and a shaft that passes the position F and parallels the Y-axis provides an axle of the rear wheel 13. The middle wheels 12 and the rear wheels 13 rotate about the respective axles. The length of the lower link 25 is fixed. Accordingly, the distance between the axle of the middle wheel 12 and the axle of the rear wheel 13 is constant. Namely, the distance between E and F is constant.

The second linear motion mechanisms 23 are attached to the upper frame 21. At a position A between the position B and the position D, the upper end of each of the second linear motion mechanisms 23 is connected to the upper frame 21. The second linear motion mechanisms 23 extend downward from the upper frame 21.

The middle wheels 12 and the lower links 25 are attached to the lower ends of the corresponding linear motion mechanisms 23. Namely, the middle wheel 12R is rotatably attached to the second linear motion mechanism 23R, and the middle wheel 12L is rotatably attached to the second linear motion mechanism 23L. At the position E, the second linear motion mechanism 23 is connected to the middle wheel 12 and the lower link 25. Thus, the second linear motion mechanism 23 couples the upper frame 21 with the middle wheel 12.

Each of the second linear motion mechanisms 23 is, for example, an arm mechanism capable of extending and contracting. The length of the second linear motion mechanism 23 is variable. Accordingly, the distance between the upper frame 21 and the middle wheel 12 can be changed. With the second linear motion mechanism 23 thus extended and contracted, the angle of the lower link 25 can be changed. The angle between the upper frame 21 and the second linear motion mechanism 23 is variable. Namely, at the position A, the upper frame 21 and the second linear motion mechanism 23 are connected to each other via a passive joint. The second linear motion mechanism 23 rotates about a rotational axis that passes the position A and parallels the Y-axis, relative to the upper frame 21.

The angle between the lower link 25 and the second linear motion mechanism 23 is variable. Namely, the lower link 25 and the second linear motion mechanism 23 are connected to each other via a passive joint. Accordingly, the lower end of the second linear motion mechanism 23 is rotatably coupled to the front end of the lower link 25. The lower link 25 rotates about a rotational axis that passes the position E and parallels the Y-axis, relative to the second linear motion mechanism 23.

Further, the third linear motion mechanism 26 is provided between the upper frame 21 and the rear links 24. Namely, the third linear motion mechanism 26 couples the upper frame 21 with the rear links 24. The upper end of the third linear motion mechanism 26 is attached to the upper frame 21, at a point between the position A and the position B. The lower end of the third linear motion mechanism 26 is attached to the rear links 24, at a point between the position O and the position D. The angle formed by the third linear motion mechanism 26 and the upper frame 21 is variable. Namely, the upper frame 21 and the third linear motion mechanism 26 are connected to each other via a passive joint. The third linear motion mechanism 26 rotates about a rotational axis that parallels the Y-axis, relative to the upper frame 21.

Also, the angle formed by the third linear motion mechanism 26 and each of the rear links 24 is variable. Namely, the rear link 24 and the third linear motion mechanism 26 are connected to each other via a passive joint. The third linear motion mechanism 26 serves as an actuator that changes the angle $\alpha$. The third linear motion mechanism 26 rotates about a rotational axis that parallels the Y-axis, relative to the rear link 24.

As described above, the variable mechanism 20 includes the first linear motion mechanisms 22R, 22L, second linear motion mechanisms 23R, 23L, and the third linear motion mechanism 26. Accordingly, the variable mechanism 20 is constructed by use of five-axis prismatic joints. Namely, the variable mechanism 20 can change its attitude by means of five actuators. The first linear motion mechanisms 22 provide front legs, and the second linear motion mechanisms 23 provide rear legs. In this embodiment, the front wheels 11R, 11L are drive wheels.

Each of the first linear motion mechanisms 22, second linear motion mechanisms 23, and the third linear motion mechanism 26 is a link mechanism capable of extending and contracting. Each of the first linear motion mechanisms 22, second linear motion mechanisms 23, and the third linear motion mechanism 26 includes a drive unit having a motor, brake, and an encoder, and a link that extends and contracts by means of the drive unit. A known linear actuator may be used as the linear motion mechanism (each of the first linear motion mechanisms 22, second linear motion mechanisms 23, and the third linear motion mechanism 26). For example, the linear motion mechanism converts force that acts in a rotational direction of a servo motor, into force that acts in an extending and contracting direction, by means of a ball screw. By reducing the lead of the ball screw, it is possible to obtain large force in a linear direction, using small force. Thus, the linear motion mechanisms are prevented from being pushed by the weight of the person on board 90 and contracting, and its attitude can be maintained. Since the linear actuators are used in this embodiment, the configuration of the variable mechanism 20 can be simplified.

Further, a gas spring may also be used in the linear motion mechanism, so that the load of the motor can be reduced.

Also, the linear motion mechanism is not limited to a motor-driven actuator, but may be a linear actuator of a hydraulic or pneumatic type.

As shown in FIG. 4, the length of the first linear motion mechanism 22 is expressed as $(c+s_f)$, and the length of the second linear motion mechanism 23 is expressed as $(g+s_r)$. Here, $s_f$ denotes the movable distance (stroke) of the first linear motion mechanism 22, and $s_r$ denotes the movable distance (stroke) of the second linear motion mechanism 23, while $s_m$ denotes the length of the third linear motion mechanism 26. Also, "a" denotes the distance between O and A, and "b" denotes the distance between A and B. The distance between O and D, namely, the length of the rear link 24, is denoted by "d". The distance between E and D is denoted by "e", and the distance between D and F is denoted by "f". The length of the lower link 25 is expressed as (e+f). "a" through "g" are fixed values, and $s_m$, $s_r$, $s_f$ are variable values. Also, the radius of the front wheel 11 is denoted by $r_f$, and the radius of the rear wheel 13 is denoted by $r_r$. The radius of the middle wheel 12 may be the same as the radius $r_r$ of the rear wheel 13.

When the first linear motion mechanism 22 extends or contracts, the distance between the corresponding front wheel 11 and the upper frame 21 changes. As a result, the front-side height of the seat 14 can be changed. When the second linear motion mechanism 23 extends or contracts, the distance between the corresponding middle wheel 12 and the upper frame 21 changes. The first linear motion mechanism 22R and the first linear motion mechanism 22L can be driven independently of each other. Similarly, the second linear motion mechanism 23R and the second linear motion mechanism 23L can be driven independently of each other. When the third linear motion mechanism 26 extends or contracts, the angle α changes. By using the second linear motion mechanisms 23 and the third linear motion mechanism 26, ground contact conditions of the middle wheels 12 and the rear wheels 13 can be changed. When the second linear motion mechanism 23 and the third linear motion mechanism 26 extend or contract, the angle between the lower link 25 and the rear link 24 changes. Further, the height from the ground to the position A changes. By driving the third linear motion mechanism 26 in association with the second linear motion mechanisms 23, it is possible to change the pitch angle (the angle about an axis parallel to the Y-axis) of the seat 14.

In the above description, the third linear motion mechanism 26 is provided by one actuator. Namely, the third linear motion mechanism 26 is common to or shared by the right and left rear links 24R, 24L. However, the third linear motion mechanism 26 may be in the form of right and left independent actuators. Namely, two actuators may be mounted symmetrically. In this case, the angle α may be different angles on the right and left sides. As a matter of course, two linear motion mechanisms that extend and contract by the same length may be attached to the right and left rear links 24. In this case, the number of actuators is increased, but the attitude can be more appropriately controlled.

It is preferable that omni wheels are used as the middle wheels 12 and the rear wheels 13. If universal casters are used, for example, the casters may not be able to rotate in accordance with changes in the angle of the lower links 25 relative to the ground, since the universal casters are of rotational plane type. Namely, it becomes difficult to rotate the wheel if the axis of rotation of the universal caster is not perpendicular to the ground. Accordingly, it is preferable to make the rotation axis of the caster perpendicular to the ground at all times. Thus, in this embodiment, the middle wheels 12 and the rear wheels 13 are in the form of omni wheels.

Figure 5:
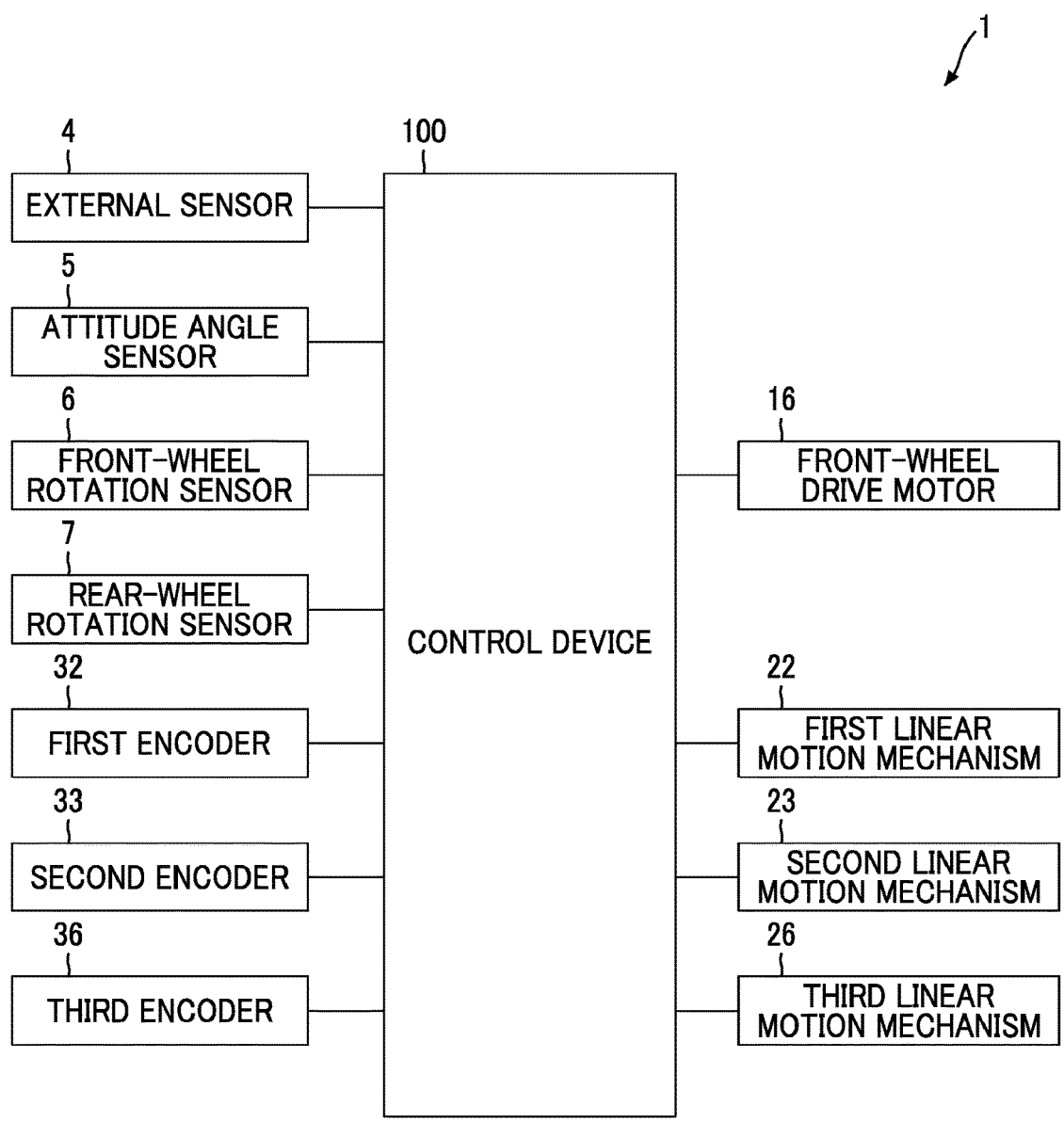
FIG. 5 is a block diagram showing the hardware configuration of the traveling vehicle according to a first embodiment.

FIG. 5 is a block diagram showing the hardware configuration of the traveling vehicle 1 according to a first embodiment. As described above, the traveling vehicle 1 has the external sensor 4, attitude angle sensor 5, front-wheel rotation sensors 6, front-wheel drive motors 16, rear-wheel rotation sensors 7, first linear motion mechanisms 22, second linear motion mechanisms 23, and the third linear motion mechanism 26. Further, the traveling vehicle 1 has first encoders 32, second encoders 33, and third encoder 36 as encoders associated with the first linear motion mechanisms 22, second linear motion mechanisms 23, and the third linear motion mechanism 26, respectively. The first encoder 32 detects the amount of change ($s_f$) of the length of the first linear motion mechanism 22. The second encoder 33 detects the amount of change ($s_r$) of the length of the second linear motion mechanism 23. The third encoder 36 detects the amount of change ($s_m$) of the length of the third linear motion mechanism 26. Namely, the first encoders 32, second encoders 33, and the third encoder 36 function as sensors (detectors).

The control device 100 is connected by wire or wirelessly to the external sensor 4, attitude angle sensor 5, front-wheel rotation sensors 6, front-wheel drive motors 16, rear-wheel rotation sensors 7, first linear motion mechanisms 22, second linear motion mechanisms 23, third linear motion mechanism 26, first encoders 32, second encoders 33, and the third encoder 36. The control device 100 receives signals from the external sensor 4, attitude angle sensor 5, front-wheel rotation sensors 6, rear-wheel rotation sensors 7, first encoders 32, second encoders 33, and the third encoder 36, and controls operation of the front-wheel drive motors 16, first linear motion mechanisms 22, second linear motion mechanisms 23, and the third linear motion mechanism 26.

More specifically, the control device 100 controls operation of the vehicle body 10 (for example, the front-wheel drive motors 16 that drive the front wheels 11), using signals from the front-wheel rotation sensors 6. When the front-wheel rotation sensor 6 is a rotational speed sensor, for example, the control device 100 controls a torque value of the front-wheel drive motor 16, in a feedback fashion, using a signal indicating a speed value from the front-wheel rotation sensor 6, so that the rotational speed of the front wheel 11 becomes equal to a target value.

Also, the control device 100 can recognize surrounding conditions, using a signal from the external sensor 4, and can control operation of the vehicle body 10 (the front wheels 11 and the variable mechanism 20) according to the surrounding conditions. For example, when the control device 100 detects an obstacle by means of the external sensor 4, it can control operation of the front wheels 11, so as to avoid the obstacle. Also, when the control device 100 detects a landing platform of an escalator, by use of the external sensor 4, it can control operation of the front wheels 11 and the variable mechanism 20, so that the traveling vehicle 1 proceeds into the escalator, in the manner as will be described later.

The control device 100 also controls operation of the vehicle body 10 (the variable mechanism 20, i.e., the first linear motion mechanisms 22, second linear motion mechanisms 23, and the third linear motion mechanism 26), using the first encoders 32, second encoders 33, and the third encoder 36. More specifically, when the control device 100 controls the first linear motion mechanisms 22, second linear motion mechanisms 23, and the third linear motion mechanism 26, it controls operation of the first linear motion mechanisms 22, second linear motion mechanisms 23, and the third linear motion mechanism 26, through feedback control, so that signal values received from the first encoders 32, second encoders 33, and the third encoder 36 indicate respective target values. Further, the control device 100 can also control operation of the front-wheel drive motors 16, using the first encoders 32, second encoders 33, and the third encoder 36, as will be described later.

Also, the control device 100 can control operation of the vehicle body 10 (the variable mechanism 20, i.e., the first linear motion mechanisms 22, second linear motion mechanisms 23, and the third linear motion mechanism 26), by use of the attitude angle sensor 5, so that the plane in which the seat 14 lies becomes close to a horizontal plane. For example, when the height or level of the front wheels 11 and the height or level of the rear wheels 13 become different from each other due to entry of the traveling vehicle 1 into a place, such as an escalator, having steps, the control device 100 controls the variable mechanism 20, through feedback control, so that a signal value from the attitude angle sensor 5 indicates a horizontal plane. If the level of the front wheels 11 is higher than the level of the rear wheels 13, for example, the control device 100 controls the respective linear motion mechanisms so as to reduce the lengths of the first linear motion mechanisms 22 and second linear motion mechanisms 23, and increase the length of the third linear motion mechanism 26, so that the plane of the seat 14 becomes close to the horizontal plane (see FIG. 11 as will be described later). Also, if the level of the front wheels 11 is lower than the level of the rear wheels 13, the control device 100 controls the respective linear motion mechanisms so as to increase the lengths of the first linear motion mechanisms 22 and the second linear motion mechanisms 23, and reduce the length of the third linear motion mechanism 26, so that the plane of the seat 14 becomes close to the horizontal plane (see FIG. 17 as will be described later).

Figure 6:
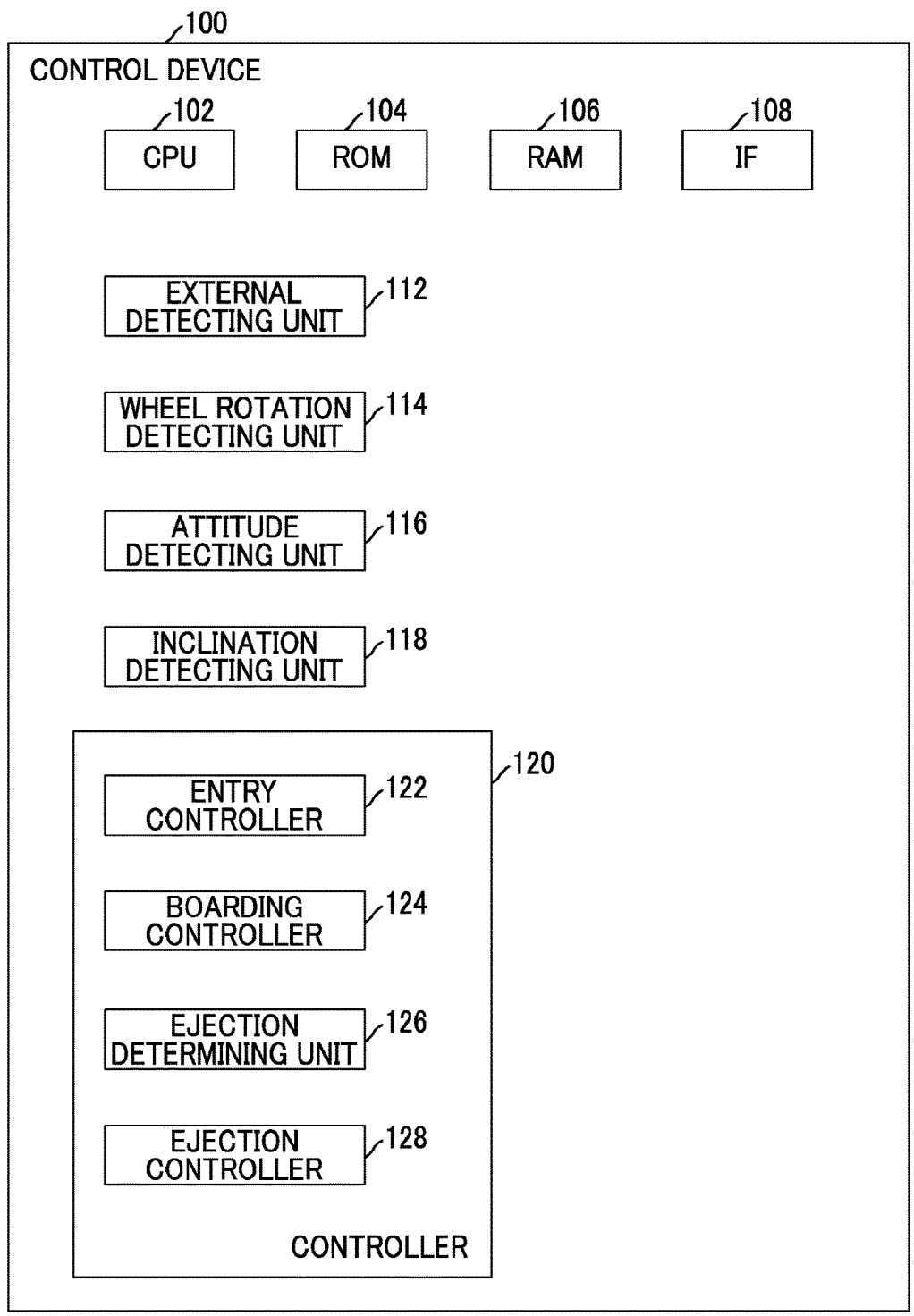
FIG. 6 is a block diagram showing the configuration of a control device according to the first embodiment.

FIG. 6 is a block diagram showing the configuration of the control device 100 according to the first embodiment. The control device 100 is, for example, a computer. The control device 100 has CPU (Central Processing Unit) 102, ROM (Read Only Memory) 104, ROM (Random Access Memory) 106, and an interface unit 108 (IF: Interface), as components of main hardware configuration. The CPU 102, ROM 104, RAM 106, and the interface unit 108 are connected to each other via data buses, or the like.

The CPU 102 functions as a computing device that performs control operation and computations, for example. The ROM 104 has a function of storing control programs, computation programs, etc. to be executed by the CPU 102. The RAM 106 has a function of temporarily storing processing data, etc. The interface unit 108 performs input/output of signals with the outside by wire or wirelessly. The interface unit 108 may include a communication port(s).

The control device 100 has an external detecting unit 112, wheel rotation detecting unit 114, attitude detecting unit 116, inclination detecting unit 118, and a controller 120. The controller 120 has an entry controller 122, boarding controller 124, ejection determining unit 126, and an ejection controller 128. The external detecting unit 112, wheel rotation detecting unit 114, attitude detecting unit 116, inclination detecting unit 118, and the controller 120 can be implemented when the CPU 102 executes programs stored in the ROM 104, for example. The external detecting unit 112, wheel rotation detecting unit 114, attitude detecting unit 116, inclination detecting unit 118, and the controller 120 may also be implemented, by recording necessary programs in any non-volatile recording medium, and installing the programs as needed.

The programs may also be stored by use of various types of non-transitory computer readable media, and may be supplied to the computer. The non-transitory computer readable media include various types of tangible storage media. Examples of the non-transitory computer readable media include magnetic recording media (such as a flexible disk, magnetic tape, and a hard disk drive), magneto-optical recording media (such as a magneto-optical disk), CD-ROM, CD-R, CD-R/W, and semiconductor memories (such as a mask ROM, PROM (Programmable ROM), EPROM (Erasable PROM), flash ROM, and RAM). Also, the programs may be supplied to the computer via various types of transitory computer readable media. Examples of the transitory computer readable media include an electric signal, light signal, and electromagnetic wave. The transitory computer readable media can supply programs to the computer, via a wire communication path, such as an electric wire or an optical fiber, or via a wireless communication path.

The external detecting unit 112, wheel rotation detecting unit 114, attitude detecting unit 116, inclination detecting unit 118, and the controller 120 are not limitedly implemented by software as described above, but may be implemented by hardware, such as some circuit elements. Further, the external detecting unit 112, wheel rotation detecting unit 114, attitude detecting unit 116, inclination detecting unit 118, and the controller 120 need not be provided in a physically one device, but may be configured as individual pieces of hardware. In this case, each of the external detecting unit 112, wheel rotation detecting unit 114, attitude detecting unit 116, inclination detecting unit 118, and the controller 120 may function as a computer.

The external detecting unit 112 receives a signal from the external sensor 4, via the interface unit 108. The external detecting unit 112 analyzes the signal from the external sensor 4, and detects conditions surrounding the traveling vehicle 1. Namely, the external detecting unit 112 and the external sensor 4 constitute a detecting unit (second detecting unit) that detects conditions surrounding the traveling vehicle 1. In the case where the external sensor 4 is a camera, for example, the external detecting unit 112 receives image data from the external sensor 4. The external detecting unit 112 performs image recognition processing on the image data thus received, and recognizes an object(s) that is present around the traveling vehicle 1. The external detecting unit 112 outputs the result of the above processing to the controller 120.

The wheel rotation detecting unit 114 receives signals from the front-wheel rotation sensors 6 (and the rear-wheel rotation sensors 7), via the interface unit 108. The wheel rotation detecting unit 114 detects conditions of the front wheels 11 (and the rear wheels 13), by analyzing the received signals. Namely, the wheel rotation detecting unit 114 and the front-wheel rotation sensors 6 constitute a detecting device (first detecting device) that detects conditions of the front wheels 11 as drive wheels. In the case where the front-wheel rotation sensors 6 are rotational speed sensors, for example, the wheel rotation detecting unit 114 receives signals indicative of the rotational speeds, and obtains the rotational speeds of the front wheels 11. The wheel rotation detecting unit 114 outputs the result of the above processing to the controller 120.

The attitude detecting unit 116 receives a signal from the attitude angle sensor 5, via the interface unit 108. The attitude detecting unit 116 analyzes the received signal, and detects the inclination of the seat 14. The attitude detecting unit 116 outputs the result of the above processing to the controller 120.

The inclination detecting unit 118 receives signals indicative of the displacements of the first linear motion mechanisms 22, second linear motion mechanisms 23, and the third linear motion mechanism 26, from the first encoders 32, second encoders 33, and the third encoder 36, respectively, via the interface unit 108. The inclination detecting unit 118 also obtains the inclination of the seat 14. The inclination detecting unit 118 may receive a signal from the attitude angle sensor 5 via the interface unit 108, or may receive data indicative of the inclination of the seat 14 from the attitude detecting unit 116.

The inclination detecting unit 118 calculates a difference (height difference) between the height of the front wheels 11 and the height of the rear wheels 13, from the inclination of the seat 14, and the displacements of the first linear motion mechanisms 22, second linear motion mechanisms 23, and the third linear motion mechanism 26. In this manner, the inclination detecting unit 118 can detect an angle of inclination of a place where the vehicle body 10 is located. Accordingly, the inclination detecting unit 118 cooperates with the attitude angle sensor 5, first encoders 32, second encoders 33, and the third encoder 36 to constitute a detecting device (third detecting device) that detects the inclination angle corresponding to the height difference when the vehicle body 10 is located at the place (such as an escalator or stairs) having the height difference. When the inclination of the seat 14 is strictly controlled such that the seat 14 lies in the horizontal plane, the inclination detecting unit 118 may cooperate with the first encoders 32, second encoders 33, and the third encoder 36 to constitute the detecting device (third detecting device) that detects the inclination angle corresponding to the height difference when the vehicle body 10 is located at the place having the height difference. The inclination detecting unit 118 outputs the result of the above processing to the controller 120.

The height difference between the front wheels 11 and the rear wheels 13 can be geometrically uniquely determined from the inclination of the seat 14 (namely, the inclination of the upper frame 21), and the displacements of the first linear motion mechanisms 22, second linear motion mechanisms 23, and the third linear motion mechanism 26. The height difference may be a difference between the height of ground contact points of the front wheels 11 and the height of ground contact points of the rear wheels 13, or may be a difference between the height of the axles of the front wheels 11 and the height of the axles of the rear wheels 13. When the height difference between the axles is used, the radius of the front wheels 11 and the radius of the rear wheels 13 may be taken into consideration.

As described above, the controller 120 controls operation of the front-wheel drive motors 16, first linear motion mechanisms 22, second linear motion mechanisms 23, and the third linear motion mechanism 26, using data received from the external detecting unit 112, wheel rotation detecting unit 114, attitude detecting unit 116, and the inclination detecting unit 118. In this manner, the controller 120 controls operation of the vehicle body 10. Here, the controller 120, external detecting unit 112, wheel rotation detecting unit 114, attitude detecting unit 116, and the inclination detecting unit 118 also control normal operation of the vehicle body 10, other than control related to boarding and exiting an escalator, which will be described later. Namely, the external sensor 4, attitude angle sensor 5, front-wheel rotation sensors 6, rear-wheel rotation sensors 7, first encoders 32, second encoders 33, and the third encoder 36 (first detecting device, second detecting device, third detecting device) are general detecting means (sensors) used in control of operation of the vehicle body 10.

The controller 120 can switch between a boarding control mode (first control mode) as control performed when the vehicle body 10 is on the escalator, and an ejection control mode (second control mode) as control performed when the vehicle body 10 is ejected from the escalator. The entry controller 122 controls the vehicle body 10 (the front-wheel drive motors 16, first linear motion mechanisms 22, second linear motion mechanisms 23, and the third linear motion mechanism 26), when the vehicle body 10 proceeds into the escalator. The boarding controller 124 controls the vehicle body 10 (the front-wheel drive motors 16, first linear motion mechanisms 22, second linear motion mechanisms 23, and the third linear motion mechanism 26), when the vehicle body 10 is on board the escalator. Namely, the boarding controller 124 performs control in the boarding control mode.

The ejection determining unit 126 determines whether the vehicle body 10 is approaching the end of the escalator, and it is the time to eject the vehicle body 10 from the escalator. Then, when the ejection determining unit 126 determines that it is the time to eject the vehicle body 10 from the escalator, it starts the ejection controller 128. The ejection controller 128 controls the vehicle body 10 (the front-wheel drive motors 16, first linear motion mechanisms 22, second linear motion mechanisms 23, and the third linear motion mechanism 26) when the vehicle body 10 ejects from the escalator. Namely, the ejection controller 128 performs control in the ejection control mode. Then, the ejection determining unit 126 performs switching between the boarding control mode and the ejection control mode. Specific operations of the entry controller 122, boarding controller 124, ejection determining unit 126, and the ejection controller 128 will be described later.

Figure 7:
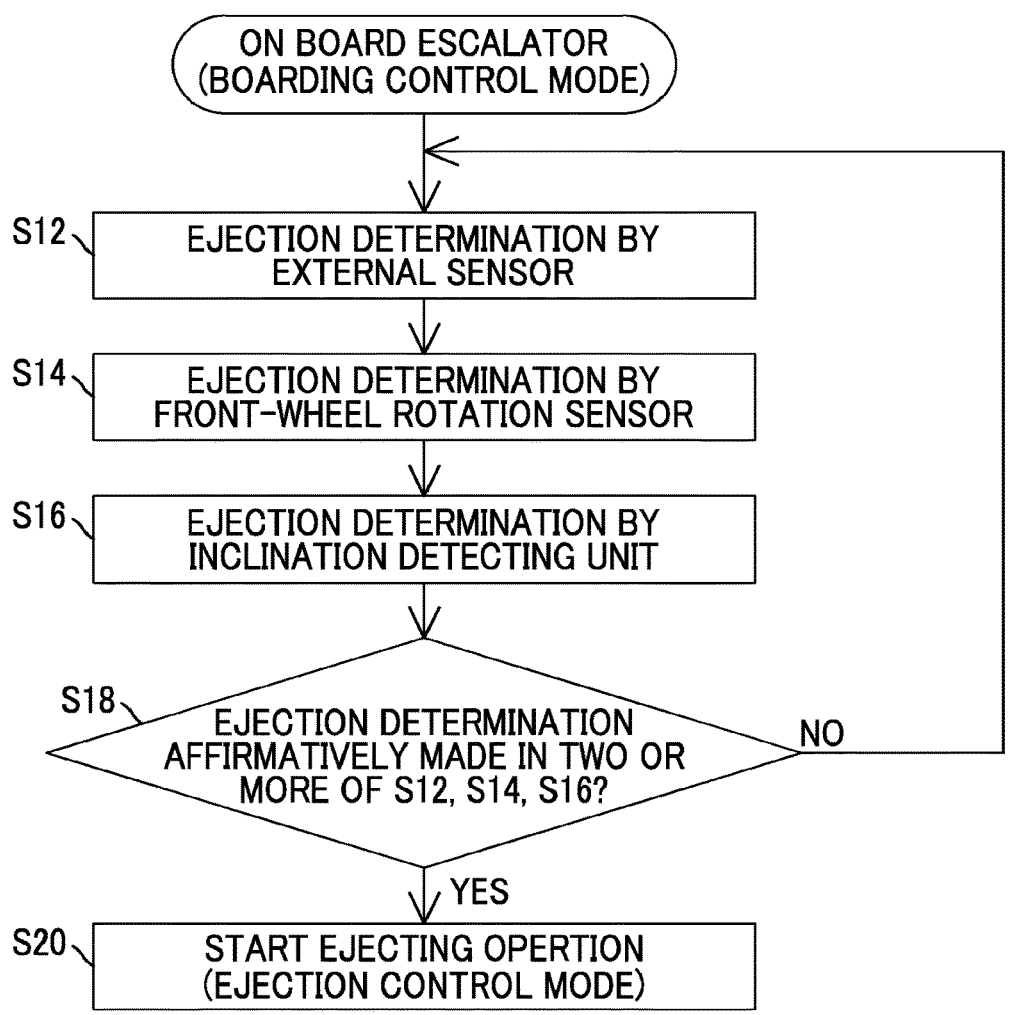
FIG. 7 is a flowchart illustrating the outline of a control routine for switching between a boarding control mode and an ejection control mode, which routine is performed by an ejection determining unit according to the first embodiment.

FIG. 7 is a flowchart illustrating the outline of a routine for switching between the boarding control mode and the ejection control mode, which routine is performed by the ejection determining unit 126 according to the first embodiment. Namely, FIG. 7 shows a method of controlling the traveling vehicle 1 according to the first embodiment. When the vehicle body 10 is on board an escalator, namely, when the control mode of the controller 120 is the boarding control mode, the ejection determining unit 126 makes an ejection determination (second determination) by means of the external sensor 4 (step S12). More specifically, the ejection determining unit 126 determines whether it is the time (ejection timing) for the vehicle body 10 to eject from the escalator, according to the processing result of the external detecting unit 112. In other words, the ejection determining unit 126 determines whether it is the ejection timing, using a signal from the external sensor 4. A specific example of ejection determination by the external sensor 4 will be described later.

The ejection determining unit 126 also makes an ejection determination (first determination) by means of the front-wheel rotation sensors 6 (step S14). More specifically, the ejection determining unit 126 determines whether it is the ejection timing, according to the processing result of the wheel rotation detecting unit 114. In other words, the ejection determining unit 126 determines whether it is the ejection timing, using signals from the front-wheel rotation sensors 6. A specific example of ejection determination by the front-wheel rotation sensors 6 will be described later.

The ejection determining unit 126 also makes an ejection determination (third determination) by means of the inclination detecting unit 118 (step S16). More specifically, the ejection determining unit 126 determines whether it is the ejection timing, according to the processing result of the inclination detecting unit 118. Namely, the ejection determining unit 126 determines whether it is the ejection timing, using signals from the attitude angle sensor 5, first encoders 32, second encoders 33, and the third encoder 36. A specific example of ejection determination by the inclination detecting unit 118 will be described later.

The ejection determining unit 126 determines whether ejection determinations were affirmatively made in two or more steps, out of the above steps S12, S14 and S16 (step S18). Namely, the ejection determining unit 126 determines whether it was determined in two or more (namely, more than half) of the three steps S12, S14 and S16 that the ejection timing has been reached. Then, if it was determined in two or more steps that the ejection timing has been reached (YES in step S18), the ejection determining unit 126 sends a command to start ejecting operation, to the ejection controller 128. As a result, the ejection controller 128 starts ejecting operation (step S20). Accordingly, the control mode switches to the ejection control mode. In other words, the ejection determining unit 126 switches the control mode from the boarding control mode to the ejection control mode. On the other hand, if the number of steps in which it is determined that the ejection timing has been reached is less than two (NO in step S18), the ejection determining unit 126 continues the boarding control mode, without switching the control mode to the ejection control mode, and the control returns to step S12.

Thus, in this embodiment, the timing of ejection of the vehicle body 10 from the escalator is determined in three steps (S12, S14, S16), and the control mode is switched to the ejection control mode when it is determined in a part of these steps that the ejection timing has been reached. Namely, the operation to determine the ejection timing is made redundant. Accordingly, even in the case where a determination cannot be correctly made in one of the three steps, the ejection timing can be determined by use of the remaining steps. Namely, even in the case where an abnormality occurs to one of the sensors (detectors) used in the three steps, the vehicle body 10 is able to eject from the escalator in appropriate timing. The "abnormality" mentioned herein may include deterioration of the accuracy due to chronological degradation, etc. of a sensor, as well as a failure of a sensor.

Further, the sensors used in the above three steps are not dedicated sensors provided solely for determining the timing of ejection from the escalator, but are originally installed on the traveling vehicle, as general sensors used for normal operation of the traveling vehicle 1. Thus, the traveling vehicle 1 according to this embodiment can use these sensors, for both purposes of normal operation of the traveling vehicle 1, and detection of the timing of ejection from the escalator. Accordingly, the traveling vehicle 1 according to this embodiment is able to eject from the escalator even in the case where an abnormality occurs to one sensor (detector), without additionally installing any dedicated sensor for detecting the timing of ejection from the escalator.

Further, in the first embodiment, when it is determined in more than half of the three steps that the ejection timing has been reached, the control mode is switched to the ejection control mode. In the case where it cannot be determined whether any abnormality occurs to a sensor, even if it is determined in one step that the ejection timing has been reached, it cannot been determined whether this determination is correct. Namely, when an abnormality occurs to a sensor involved in the step in which it is determined that the ejection timing has been reached, this determination may be actually wrong, but it cannot be determined that this determination is wrong since it is not clear whether the sensor is at fault. Accordingly, if the control mode is switched when it is determined only in one step that the ejection timing has been reached, the control mode may be switched to the ejection control mode based on the erroneous determination.

On the other hand, in the first embodiment, when it is determined in more than half of the three steps that the ejection timing has been reached, the control mode is switched to the ejection control mode. Here, even when an abnormality occurs to one sensor, another abnormality is unlikely to occur in other sensors. In other words, abnormalities are unlikely to occur in two or more sensors. Accordingly, even when an abnormality occurs to a sensor involved in one step, and it is erroneously determined in this step that the ejection timing has been reached, it is not determined in other two steps that the ejection timing has been reached, if sensors involved in the other two steps are normal. In this case, the control mode is not switched to the ejection control mode by mistake. Conversely, when it is normally determined in two steps involving normal sensors that the ejection timing has been reached, the control mode is appropriately switched to the ejection control mode, even if it is not determined in one step involving an abnormal sensor that the ejection timing has been reached. Accordingly, the traveling vehicle 1 according to the first embodiment is able to more appropriately eject from the escalator, even when an abnormality occurs to any of the two or more sensors (detectors).

In other words, when it is determined in more than half of the steps that the ejection timing has been reached, the sensors involved in these steps are unlikely to be at fault or abnormal. Accordingly, the determinations made in more than half of the steps are highly likely to be correct. Thus, in the first embodiment, the reliability of determination on the timing of ejection from the escalator can be improved.

In the meantime, the order of execution of steps S12-S16 is not limited to that of the flowchart of FIG. 7. Also, steps S12-S16 may be executed in parallel. Also, even if a negative decision (NO) is obtained in step S18, the controller 120 may start ejecting operation, when a given time has elapsed from the time when the vehicle body 10 boards the escalator. This also applies to control methods illustrated in other flowcharts which will be described later.

Figure 8:
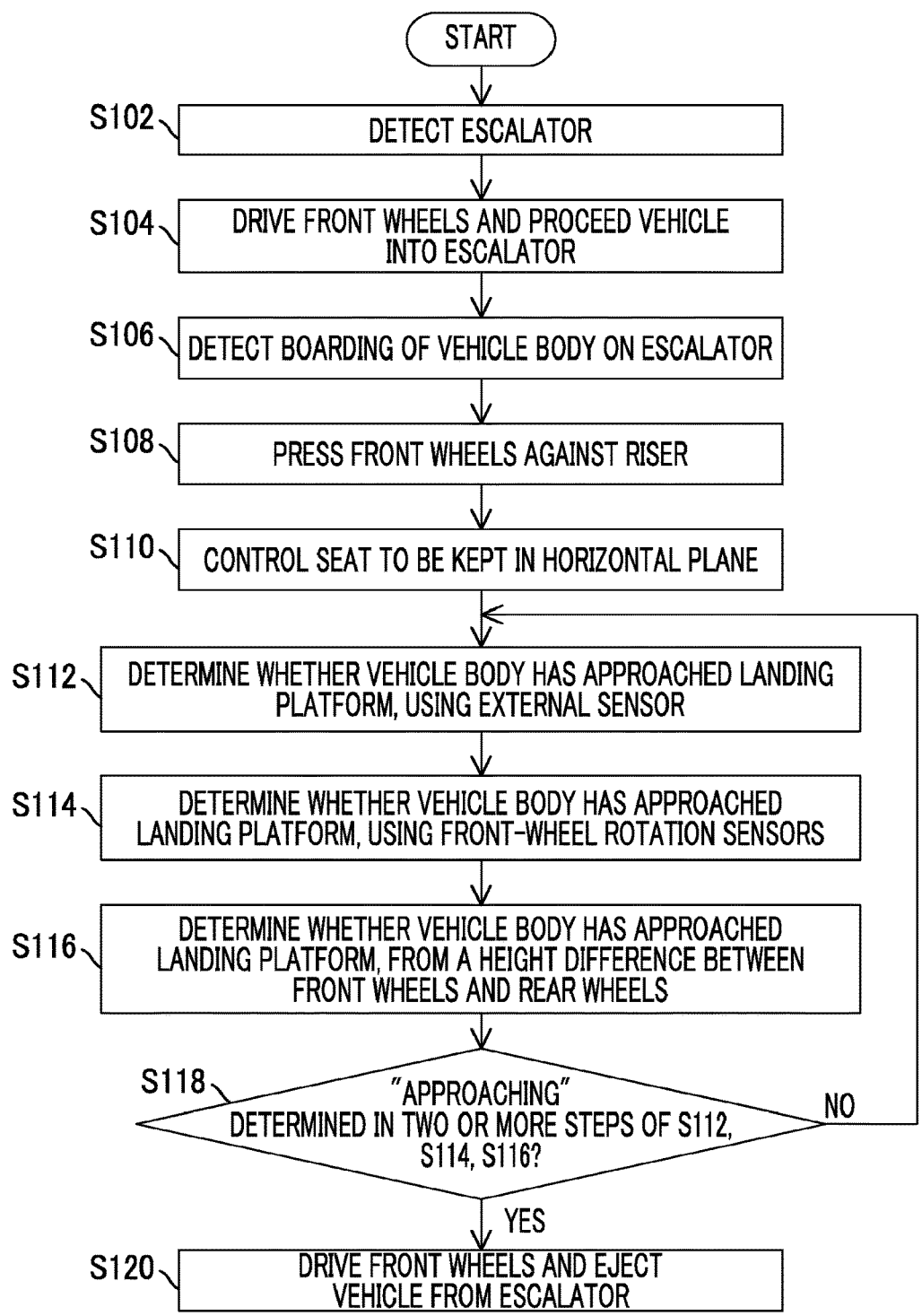
FIG. 8 is a flowchart illustrating a control routine regarding an escalator, which routine is performed by the control device of the traveling vehicle according to the first embodiment.

FIG. 8 is a flowchart illustrating a control routine regarding an escalator, which is performed by the control device 100 of the traveling vehicle 1 according to the first embodiment. In the flowchart indicated below, the control routine executed when the traveling vehicle 1 boards an up escalator is illustrated. However, the control routine executed when the traveling vehicle 1 boards a down escalator is substantially the same as that in the case of the up escalator, except for differences which will be described later.

Initially, the control device 100 detects an escalator, from a position ahead of the escalator (step S102). Specifically, the control device 100 detects the escalator, using the external sensor 4. More specifically, the external sensor 4, such as a camera, captures an image of the escalator located ahead, and creates image data, and the external detecting unit 112 of the control device 100 acquires the image data. Then, the external detecting unit 112 performs image recognition processing on the image data, and recognizes an image of the escalator included in the image data. Once the external detecting unit 112 detects the escalator, it outputs a signal indicating that the escalator is detected, to the entry controller 122.

Figure 9:
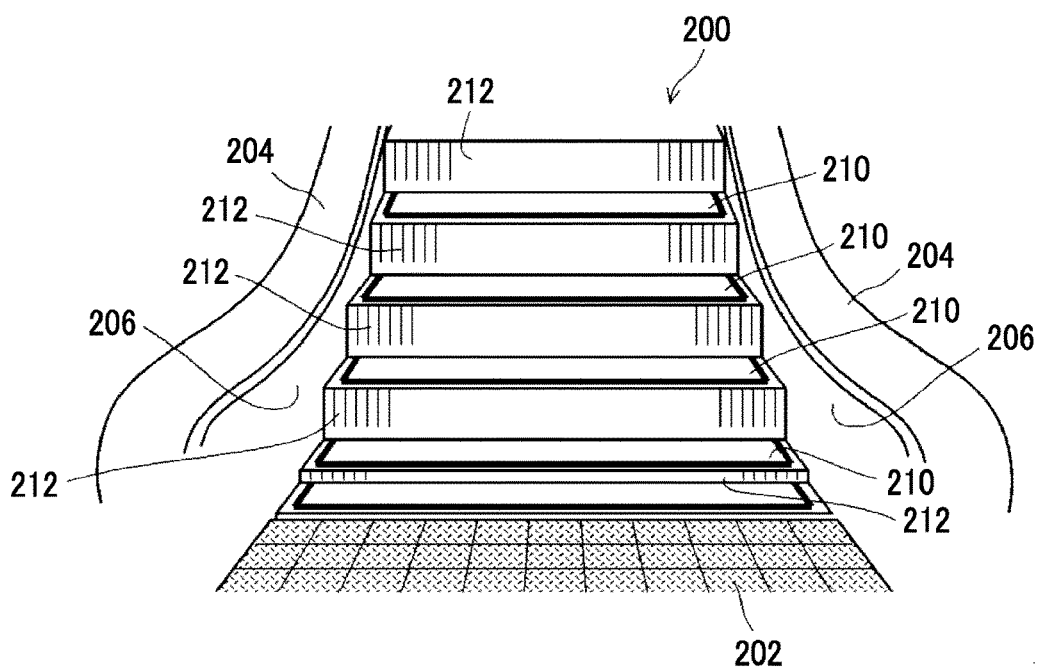
FIG. 9 is a view showing an image of the escalator obtained by an external sensor.

FIG. 9 shows an example of the image of the escalator 200 obtained by the external sensor 4. FIG. 9 shows the image of the up escalator 200. The escalator 200 has an entrance-side landing platform 202, handrails 204, skirt guard panels 206, treads 210 as steps, and risers 212 as cleated risers. The external detecting unit 112 analyzes image data corresponding to the image shown in FIG. 9 by way of example, and recognizes the escalator 200.

For example, when the external detecting unit 112 recognizes, in the image data, that an image of the landing platform 202 exists on the front side (lower side), and a series of a plurality of treads 210 and risers 212 ascend from the landing platform 202, while the handrails 204 and the skirt guard panels 206 exist on the opposite sides of the treads 210 and the risers 212, the external detecting unit 112 recognizes that the up escalator 200 exists in front of the vehicle body 10. The external detecting unit 112 also measures movement of demarcation lines provided at peripheries of the treads 210, movement of edge portions of the treads 210, and movement of the risers 212. In this manner, the external detecting unit 112 can measure the speed of the escalator 200. Further, the external detecting unit 112 determines whether any person exists in the vicinity of the landing platform 202, from the image data, and determines that the traveling vehicle 1 can proceed into the escalator 200 when no person exists.

If the escalator 200 is detected, the traveling vehicle 1 proceeds into the escalator 200 by driving the front wheels 11 (step S104). Specifically, when the entry controller 122 of the control device 100 receives a signal from the external detecting unit 112, it controls the front-wheel drive motors 16, first linear motion mechanisms 22, second linear motion mechanisms 23, and the third linear motion mechanism 26, in accordance with the speed and position of the escalator.

More specifically, the entry controller 122 determines a position at which the vehicle body 10 proceeds into the escalator 200, from the positions of the landing platform 202, handrails 204, and the skirt guard panels 206, for example, in the image data created by the external sensor 4. The entry controller 122 also determines a point in time at which the vehicle body 10 proceeds into the escalator 200, based on the time when a demarcation line appears ahead from an end portion of the landing platform 202, for example. The entry controller 122 also determines the entry speed of the vehicle body 10, according to the speed of the escalator 200. It is desirable that the entry speed of the vehicle body 10 is substantially the same as the speed of the escalator 200. Then, the entry controller 122 controls the front-wheel drive motors 16, so that the front wheels 11 rotate at a rotational speed corresponding to the entry speed of the vehicle body 10, so as to move the vehicle body 10 from the determined entry position, at the determined entry time.

Figure 10:
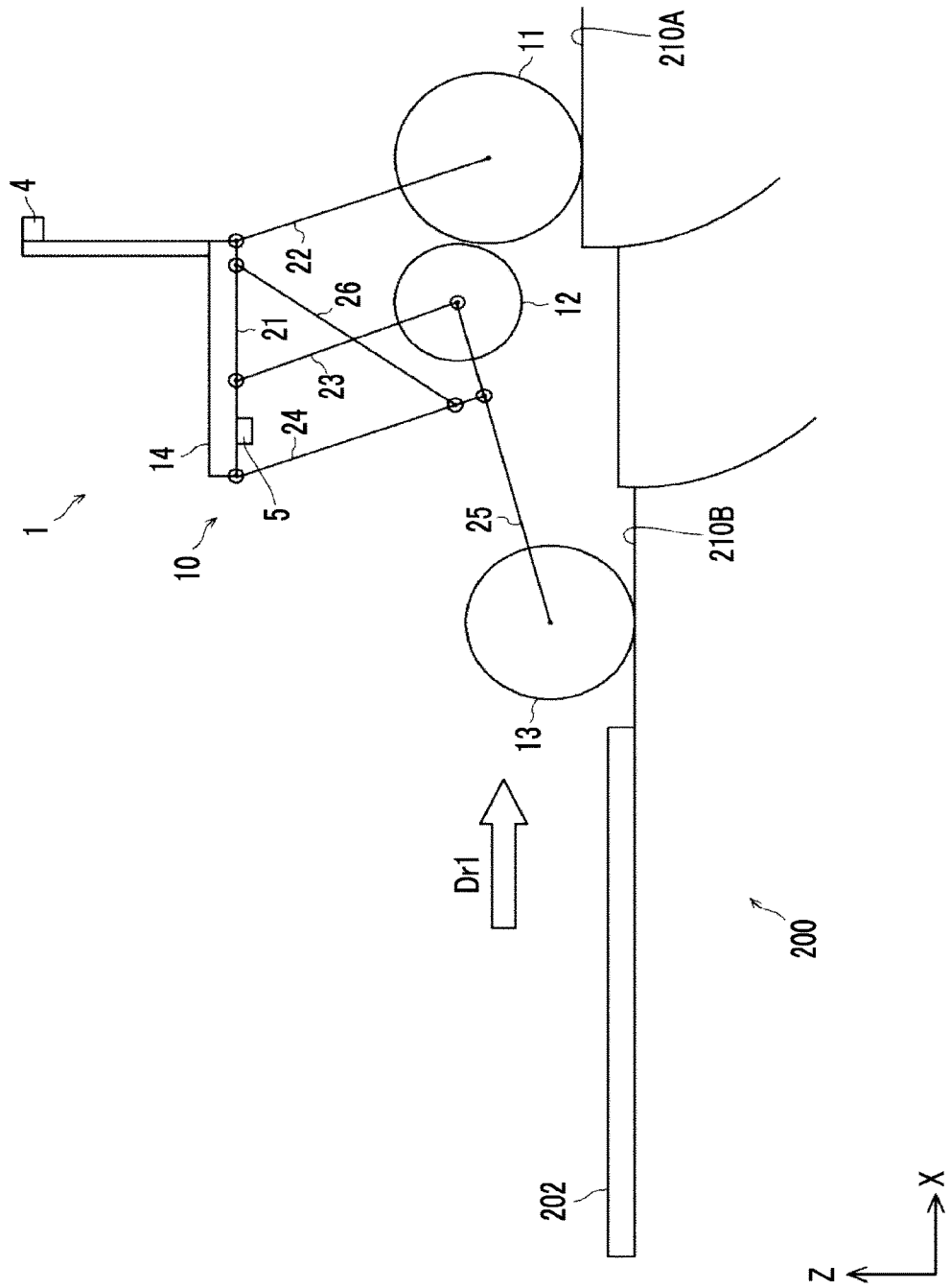
FIG. 10 is a view showing a condition in which the traveling vehicle proceeds into the escalator.

FIG. 10 shows an operating state in which the traveling vehicle 1 proceeds into the escalator 200. The entry controller 122 drives the front-wheel drive motors 16, so that the vehicle body 10 moves forward as indicated by arrow Dr1. In this connection, rotation of the front wheels 11 in such a direction that the vehicle body 10 moves forward will be referred to as "positive rotation", and the direction will be referred to as "positive direction". At a moment when the front wheels 11 step on a tread 210A, the rear wheels 13 still remain on the landing platform 202. In this case, the front wheels 11 tend to proceed forward (in the direction of arrow Dr1) due to movement of the tread 210A, but backward force is applied to the front wheels 11 since the rear wheels 13 remain on the landing platform 202. Accordingly, frictional force is applied in a direction opposite to the positive direction to the front wheels 11, due to friction with the tread 210A in addition to torque produced by the front-wheel drive motors 16. As a result, at this moment, the rotational speeds of the front wheels 11 change. If the front-wheel rotation sensors 6 detect these changes in the rotational speeds, the entry controller 122 detects stepping of the front wheels 11 on the tread 210A. At this time, the entry controller 122 controls the front-wheel drive motors 16, so as to fix the positions of the front wheels 11. As a result, brakes are applied to the front wheels 11.

The front wheels 11, which are held in a condition where they ride on the tread 210A, move forward in accordance with movement of the tread 210A, and the rear wheels 13 rotate in accordance with the movement of the front wheels 11, so that the rear wheels 13 step on a tread 210B located behind the tread 210A. When the rear wheels 13 ride on the tread 210B, and the tread 210B ascends in the same manner as the tread 210A, the rotational speeds of the rear wheels 13 become equal to zero. When the rear-wheel rotation sensors 7 detect that the rotational speeds of the rear wheels 13 become equal to zero after rotating, the entry controller 122 determines that the vehicle body 10 is on board the escalator 200 (step S106). The entry controller 122 may also determine that the vehicle body 10 is on board the escalator 200, after a lapse of time it takes from the time when the front wheels 11 ride on the tread 210A, to the time when it is presumed from the speed of the escalator 200 that the rear wheels 13 ride on the tread 210B. In this case, the rear-wheel rotation sensors 7 may not be used.

If it is determined that the vehicle body 10 is on board the escalator 200, the control mode shifts to the boarding control mode. Namely, the boarding controller 124 of the control device 100 performs control so that the front wheels 11 are pressed against the riser 212 (step S108), and performs control so that the plane of the seat 14 is kept horizontal (step S110). Thus, the boarding controller 124 performs control in the boarding control mode (S108 and S110).

Figure 11:
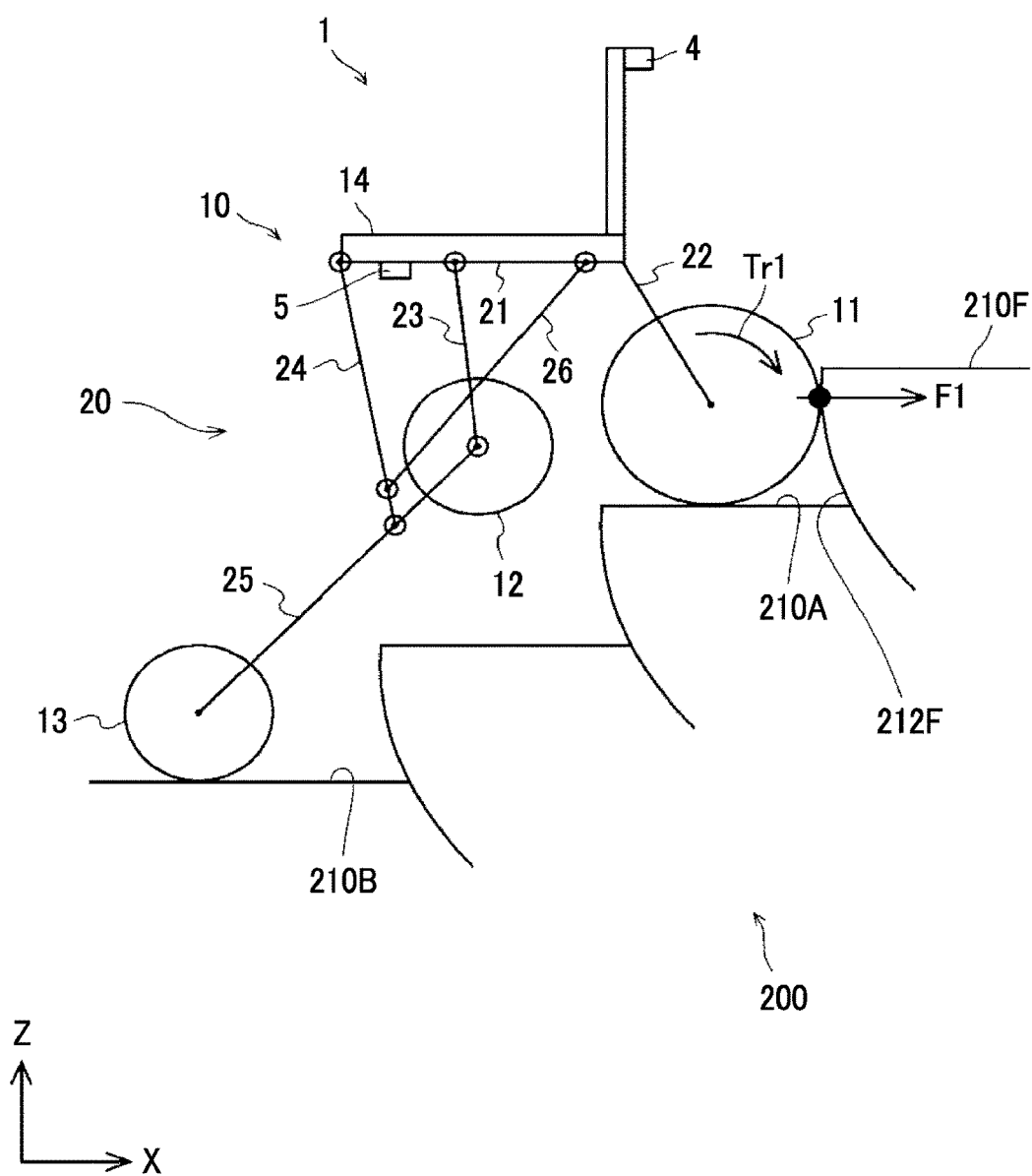
FIG. 11 is a view showing a condition of the traveling vehicle in the boarding control mode.

FIG. 11 shows a condition of the traveling vehicle 1 in the boarding control mode. The boarding controller 124 controls the front-wheel drive motors 16, so as to rotate the front wheels 11 with a given constant torque, in the positive direction, as indicated by arrow Tr1 in FIG. 11. As a result, the front wheels 11 come into contact with a riser 212F between the tread 210A on which the front wheels 11 ride, and a tread 210F located immediately ahead of the tread 210A. When the front wheels 11 come into contact with the riser 212F, the front wheels 11 come to a stop, in a condition where the wheels 11 are pressed against the riser 212F as indicated by arrow F1. Thus, the vehicle body 10 ascends in a condition where it is stopped on the escalator 200. The torque of each front-wheel drive motor 16 in the boarding control mode may be determined, such that frictional force between the corresponding front wheel 11 and the riser 212F is balanced with force applied at a contact point between the front wheel 11 and the riser 212F, due to torque of the front-wheel drive motor 16. The torque of the front-wheel drive motor 16 in the boarding control mode may also be determined, such that frictional force between the front wheel 11 and the tread 210A is balanced with force the front wheel 11 receives from the riser 212F due to the torque of the front-wheel drive motor 16. This similarly applies to the case where the traveling vehicle 1 is on board a down escalator, as will be described later.

Also, the boarding controller 124 drives the first linear motion mechanisms 22, second linear motion mechanisms 23 and the third linear motion mechanism 26, using a signal, such as an IMU (Inertial Measurement Unit) signal, from the attitude angle sensor 5, so that the plane of the seat 14 becomes horizontal. As a result, the seat 14 can be placed in a substantially horizontal plane, regardless of the angle of the escalator 200.

More specifically, as shown in FIG. 11, the boarding controller 124 controls respective linear motion mechanisms, so that the first linear motion mechanisms 22 become shorter, the second linear motion mechanisms 23 become shorter, and the third linear motion mechanism 26 becomes longer, as compared with the time when the traveling vehicle 1 is traveling on a flat place (see FIG. 1 and FIG. 4). As a result, the front wheels 11 and the middle wheels 12 are located at higher levels than the rear wheels 13. Accordingly, the seat 14 can be placed in a substantially horizontal plane. Thus, the traveling vehicle 1 can ride on the escalator 200, with an attitude that allows the person on board 90 to be easily seated. The operation of step S110 may be performed not only when the traveling vehicle 1 is on board the escalator, but also at any location where there is a difference in height between the front and rear of the traveling vehicle 1. This also similarly applies to the case where the traveling vehicle 1 is on board a down escalator, as will be described later.

While the traveling vehicle 1 is in the boarding control mode, the control device 100 determines whether it is the ejection timing, based on the results of two or more ejection determinations, as described above using FIG. 7. More specifically, the ejection determining unit 126 determines, by use of the external sensor 4, whether the vehicle body 10 has approached an exit-side landing platform 203 of the escalator 200 (step S112). The ejection determining unit 126 also determines, by use of the front-wheel rotation sensors 6, whether the vehicle body 10 has approached the landing platform 203 (step S114). The ejection determining unit 126 also determines, from a height difference between the front wheels 11 and the rear wheels 13, whether the vehicle body 10 has approached the landing platform 203 (step S116). Steps S112, S114 and S116 respectively correspond to steps S12, S14 and S16 shown in FIG. 7.

Figure 12:
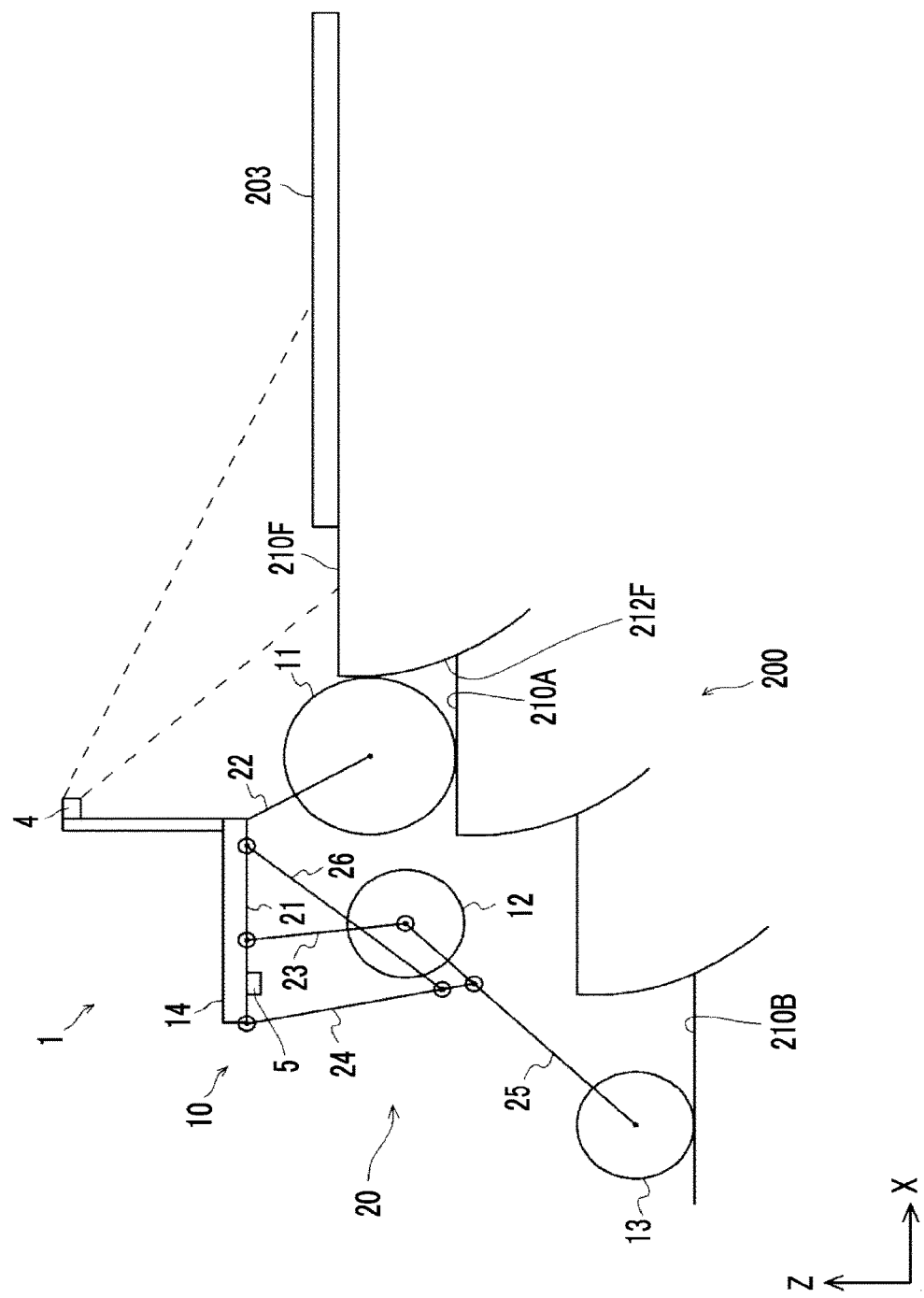
FIG. 12 is a view showing a condition in which the traveling vehicle makes an ejection determination by using the external sensor.

FIG. 12 shows a condition (S12) where the traveling vehicle 1 makes an ejection determination by use of the external sensor 4. The external sensor 4 captures an image of the lower front of the traveling vehicle 1 as indicated by broken lines, and creates image data. Then, the ejection determining unit 126 determines whether the vehicle body 10 has approached the landing platform 203, through image recognition processing (image analysis) on the image data. The recognition of an object included in the image data may be performed by the external detecting unit 112.

For example, when the landing platform 203 is recognized in the image data, the ejection determining unit 126 may determine that the vehicle body 10 has approached the landing platform 203, namely, the ejecting timing is reached, in the ejection determination of step S112. Also, when it is recognized that the demarcation lines in front of the vehicle body 10 have disappeared in the image data, the ejection determining unit 126 may determine that the vehicle body 10 has approached the landing platform 203, in the ejection determination of step S112. Also, when it is recognized that the height difference in front of the vehicle body 10 has disappeared (namely, there is a horizontal plane in front of the vehicle body 10) in the image data, the ejection determining unit 126 may determine that the vehicle body 10 has approached the landing platform 203, in the ejection determination of step S112. Also, when it is determined in step S112 that the vehicle body 10 has approached the landing platform 203, the ejection determining unit 126 may calculate a length of time T1 it takes until the front wheels 11 reach the landing platform 202, from the measured speed of the escalator 200, and affirmatively make an ejection determination after the time T1 elapses.

Figure 13:
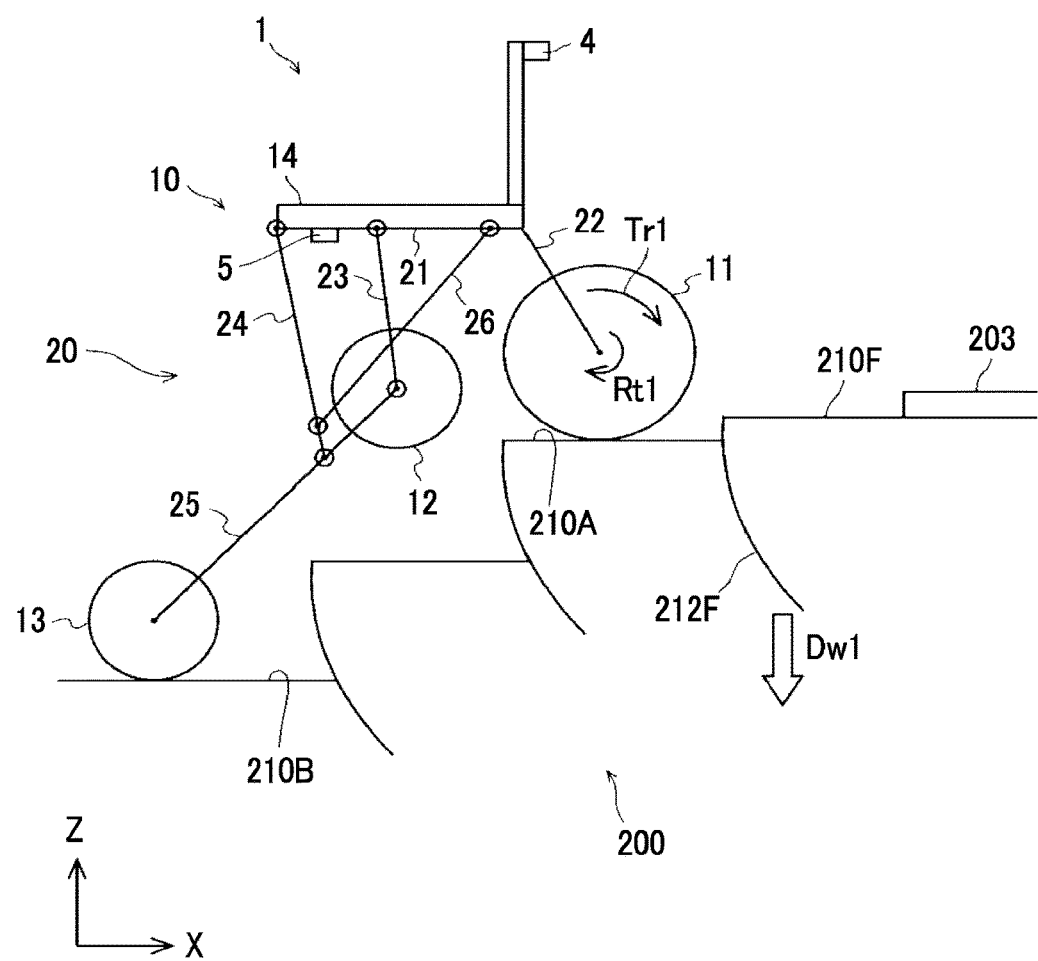
FIG. 13 is a view useful for explaining a method of making an ejection determination using front-wheel rotation sensors.
Figure 14:
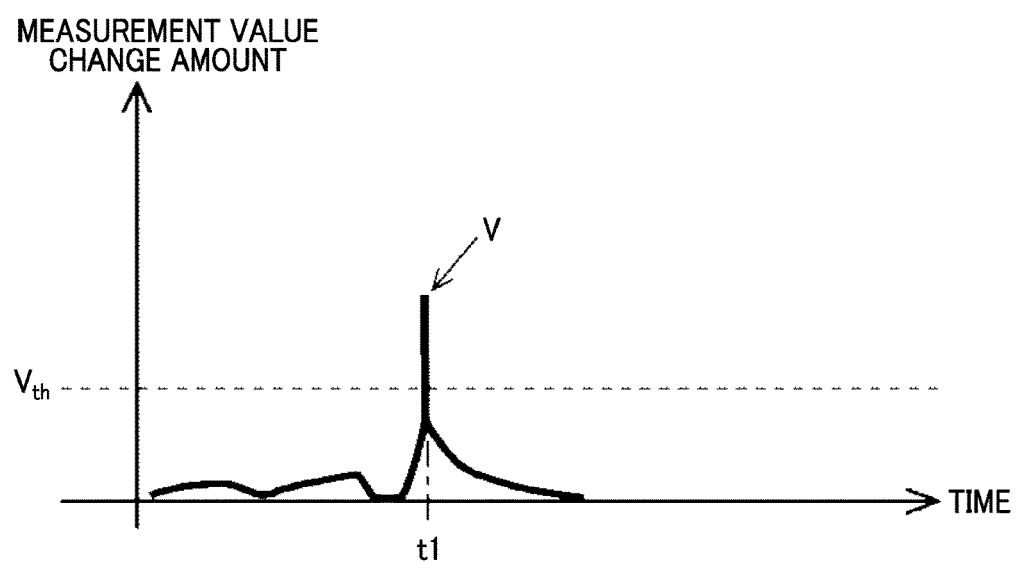
FIG. 14 is a view useful for explaining a method of making an ejection determination using the front-wheel rotation sensors.

FIG. 13 and FIG. 14 are views useful for explaining a method (S114) for making an ejection determination using the front-wheel rotation sensors 6. When the vehicle body 10 approaches the landing platform 203, the riser 212F against which the front wheels 11 are pressed is retracted downward, relative to the tread 210A, as indicated by arrow Dw1 in FIG. 13. As a result, the front wheels 11 cease to contact with the riser 212F (or the contact positions of the front wheels 11 with the riser 212F become lower than the center of rotation of the front wheels 11). Accordingly, the front wheels 11 rotate as indicated by arrow Rt1, due to torque as indicated by arrow Tr1. At this time, values (measurement values) measured by the front-wheel rotation sensors 6 largely change.

FIG. 14 shows a graph in which the horizontal axis indicates time, and the vertical axis indicates the amount of change of measurement value with time. When the riser 212F is retracted at time t1, the amount of change V of the measurement value exceeds a threshold value Vth as a predetermined amount of change, at time t1 (or immediately after time t1). The amount of change V is a difference from a reference value (a value at the time when the boarding control mode is started, for example), and can be a positive value.

For example, when the front-wheel rotation sensor 6 is a rotational speed sensor, the rotational speed rises at time t1. When the front-wheel rotation sensor 6 is a rotational angle sensor, the rotational angle changes at time t1. When the front-wheel rotation sensor 6 is a rotation torque sensor, the rotational speed of the front wheel 11 may exceed a predetermined upper limit, since torque as indicated by arrow Tr1 acts on the front wheel 11 under torque control. Accordingly, the controller 120 (boarding controller 124) reduces a control value (target value) of torque, so that the rotational speed does not exceed the upper limit. Accordingly, the amount of change of the torque value may exceed a threshold value at this time.

When the amount of change V of a measurement value (a condition of the drive wheel) of the front-wheel rotation sensor 6 exceeds the threshold value Vth, as described above, the ejection determining unit 126 determines that the vehicle body 10 has approached the landing platform 203. When it is determined in step S114 that the vehicle body 10 has approached the landing platform 203, the ejection determining unit 126 may calculate a length of time T2 it takes until the front wheels 11 reach the landing platform 202, from the measured speed of the escalator 200, and may affirmatively make an ejection determination, after a lapse of the time T2.

The amount of change V of measurement value of the front-wheel rotation sensor 6 may be detected, in a condition where the front wheel 11 is in contact with the riser 212F, before the front wheel 11 ceases to contact with the riser 212F. For example, the riser 212F is lowered as the vehicle body 10 approaches the landing platform 203. When the riser 212F is lowered, torque applied to the front wheel 11 may change, due to frictional force between the riser 212F and the front wheel 11. The ejection determining unit 126 may determine whether the vehicle body 10 has approached the landing platform 203, based on the amount of change of the torque. While the actual torque increases at this time, a target value of the torque is reduced since control for keeping the torque constant is performed.

Figure 15:
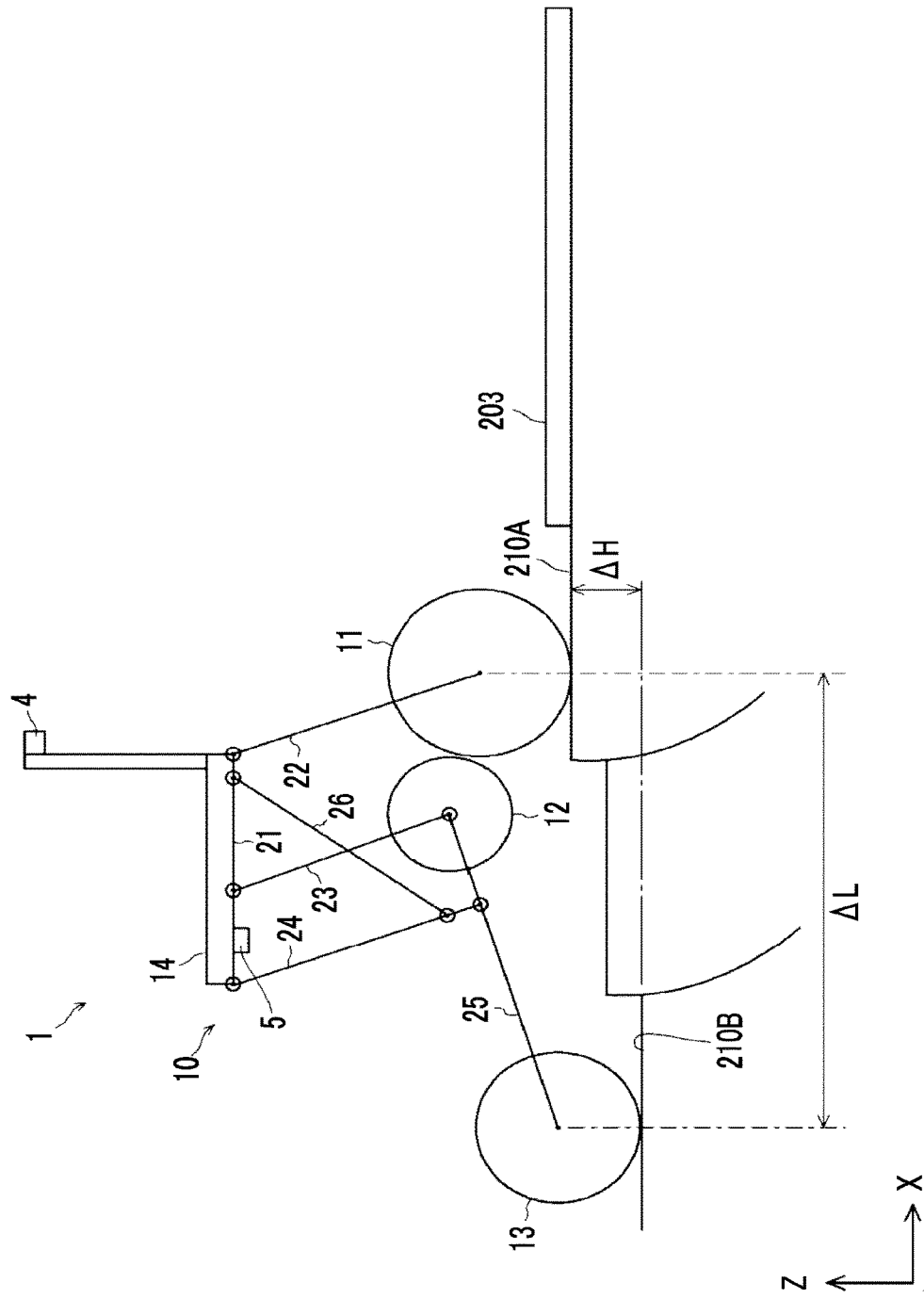
FIG. 15 is a view useful for explaining a method of making an ejection determination from a height difference between front wheels and rear wheels.

FIG. 15 is a view useful for explaining a method (S116) for making an ejection determination from a height difference between the front wheels 11 and the rear wheels 13. As the vehicle body 10 approaches the landing platform 203, a difference in height between the tread 210A and the tread 210B is reduced. As a result, a height difference ΔH between the front wheels 11 and the rear wheels 13 is reduced. Here, the inclination detecting unit 118 calculates a height difference ΔH between the front wheels 11 and the rear wheels 13, from the inclination of the seat 14 (signal of the attitude angle sensor 5), and the displacements of the first linear motion mechanisms 22, second linear motion mechanisms) 23, and the third linear motion mechanism 26 (signals of the first encoders 32, second encoders 33, and the third encoder 36), as described above. Also, the inclination detecting unit 118 calculates a distance ΔL in the horizontal direction between the front wheels 11 and the rear wheels 13, by a geometric method, from the inclination of the seat 14, and the displacements of the first linear motion mechanisms 22, second linear motion mechanisms 23, and the third linear motion mechanism 26. Accordingly, the inclination detecting unit 118 calculates the inclination angle θ of the escalator 200, according to the following equation 1.

$$\theta = \tan^{-1}(\Delta H / \Delta L) \quad \text{(Eq. 1)}$$

When the inclination angle θ becomes smaller than a predetermined inclination angle θth, the inclination detecting unit 118 determines that the vehicle body 10 has approached the landing platform 203. When it is determined in step S116 that the vehicle body 10 has approached the landing platform 203, the ejection determining unit 126 may calculate a length of time T3 it takes until the front wheels 11 approach the landing platform 202, from the measured speed of the escalator 200, and affirmatively make an ejection determination after a lapse of the time T3.

The ejection determining unit 126 determines whether it was determined in two or more of the above steps S112, S114 and S116 that the vehicle body 10 has approached the landing platform 203 (step S118). Namely, the ejection determining unit 126 determines whether an ejection determination was affirmatively made in two or more (namely, more than half) of step S112, step S114, and step S116. Then, if "approaching" was determined in the two or more steps (YES in step S118), the ejection determining unit 126 sends a command to start ejecting operation, to the ejection controller 128. As a result, the control mode shifts to the ejection control mode, and the ejection controller 128 drives the front wheels 11 so as to eject the vehicle body 10 from the escalator (step S120). On the other hand, if the number of steps in which it was determined that the vehicle body 10 has approached the landing platform 203 is less than two (NO in step S118), namely, the number of steps in which the ejection determination was affirmatively made is not more than half of the above-indicated steps, the ejection determining unit 126 does not switch the control mode to the ejection control mode. Then, the ejection determining unit 126 continues the boarding control mode, and the control returns to step S112.

At this time, the ejection determining unit 126 starts the ejection control mode, in view of time T1, time T2, and time T3. Namely, even if it is determined in two or more steps, out of steps S112, S114 and S116, that the vehicle body 10 has approached the landing platform 203, the ejection determining unit 126 does not immediately start the ejection control mode, after these determinations are made. The ejection determining unit 126 starts the ejection control mode, at the time (i.e., ejection timing) when the front wheels 11 are assumed to reach an end portion of the landing platform 203 after the determinations are made.

Suppose that T1>T2>T3, for example. In this case, when "approaching" was determined in step S112 and step S114, for example, the vehicle body 10 was closer to the landing platform 203 when "approaching" was determined in step S114, as compared with the time when "approaching" was determined in step S112. Accordingly, the ejection determining unit 126 starts the ejection control mode, when time T2 elapses from the time when "approaching" was determined in step S114.

Also, when "approaching" was determined in step S114 and step S116, for example, the vehicle body 10 was closer to the landing platform 203 when "approaching" was determined in step S116, as compared with the time when "approaching" was determined in step S114. Accordingly, the ejection determining unit 126 starts the ejection control mode, when time T3 elapses from the time when "approaching" was determined in step S116.

As described above, in ejection determinations in steps S112, S114 and S116, the ejection determining unit 126 may affirmatively make ejection determinations, after a lapse of time T1, time T2 and time T3, respectively, from the time when it was determined that the vehicle 10 has approached the landing platform 203. In this case, when it is determined in two or more steps, out of steps S112, S114, and S116, that it is the ejection timing, the ejection determining unit 126 may immediately start the ejection control mode.

Figure 16:
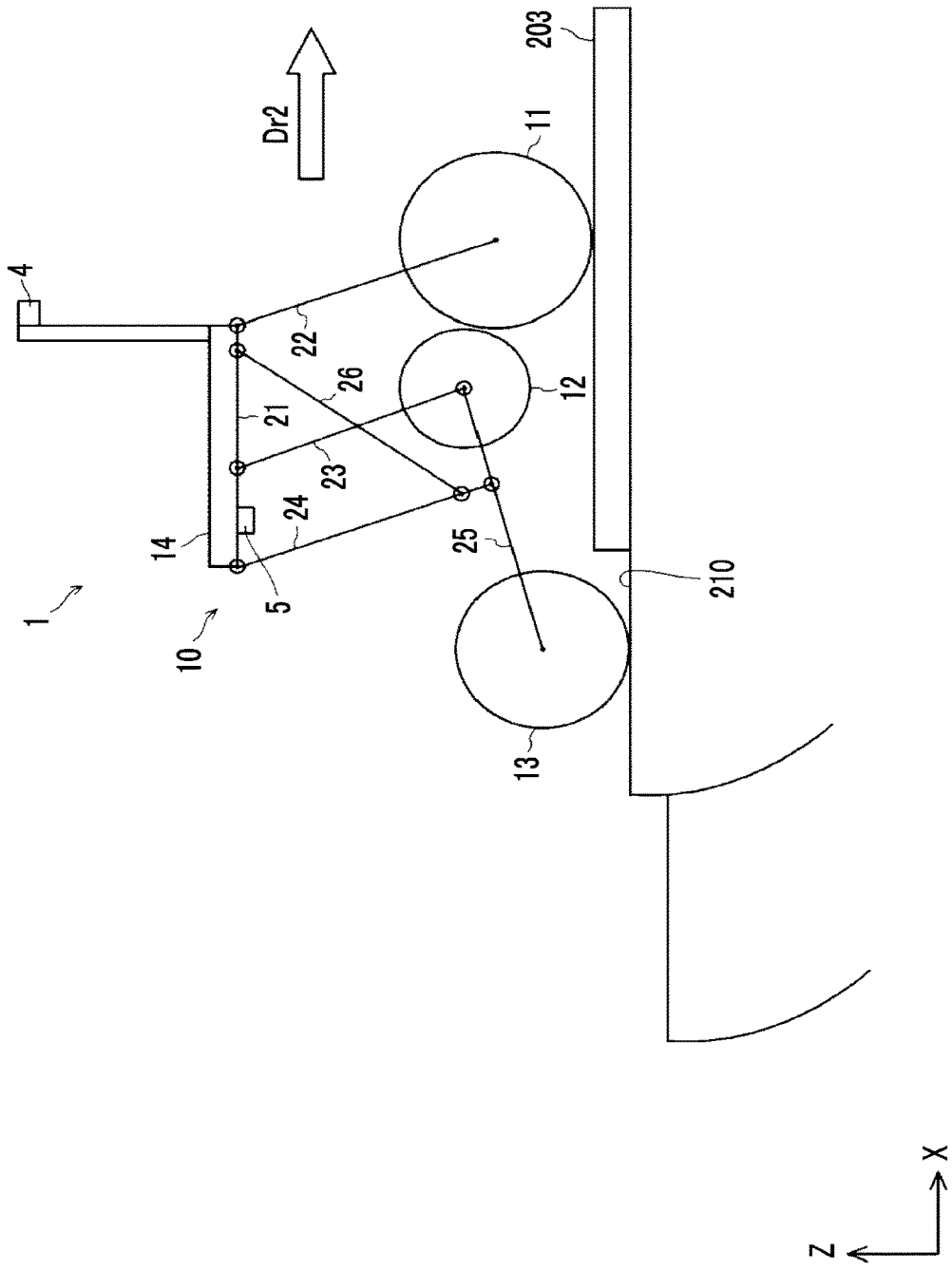
FIG. 16 is a view showing a traveling vehicle in the ejection control mode.

FIG. 16 is a view showing the traveling vehicle 1 in the ejection control mode. The ejection controller 128 drives the front wheels 11 by controlling the front-wheel drive motors 16. At this time, the ejection controller 128 controls the front-wheel drive motors 16, so that the speed of the vehicle body 10 becomes slower than the speed of the escalator 200. As a result, the vehicle body 10 moves forward at a low speed, as indicated by arrow Dr2 in FIG. 16. If the vehicle body 10 moves forward, and the front wheels 11 ride onto the landing platform 203, a load applied to each front wheel 11 changes (increase); therefore, a signal (such as the rotational speed of the front wheel 11) detected by the front-wheel rotation sensor 6 changes. Accordingly, the wheel rotation detecting unit 114 detects change of the signal of the front-wheel rotation sensor 6. In this manner, the ejection controller 128 recognizes that the front wheels 11 have come into contact with the landing platform 203.

At this time, the ejection controller 128 controls the front-wheel drive motors 16, so that the front wheels 11 move over to or ride onto the landing platform 203. Then, if the front wheels 11 ride onto the landing platform 203, a signal (such as a torque value) of each front-wheel rotation sensor 6 changes, due to change (reduction) of the load applied to the corresponding front wheel 11. Accordingly, the wheel rotation detecting unit 114 detects the change in the signal of the front-wheel rotation sensor 6. In this manner, the ejection controller 128 recognizes that the front wheels 11 have moved over to the landing platform 203. At this time, the ejection controller 128 controls the front-wheel drive motors 16, so as to increase the speed of the vehicle body 10. The ejection controller 128 may also control the front-wheel drive motors 16, so that the speed of the vehicle body 10 becomes equal to the speed of the escalator 200. In this manner, the traveling vehicle 1 can eject from the escalator 200. Also, the ejection controller 128 may recognize that the rear wheels 13 have moved over to the landing platform 203, using the rear-wheel rotation sensors 7, by substantially the same method as that in the case of the front wheels 11. In this case, the ejection controller 128 may finish the ejection control mode when it recognizes that the rear wheels 13 have moved over to the landing platform 203.

While the case of the up escalator 200 is assumed in the flowchart shown in FIG. 8, this embodiment may be applied to the case where the traveling vehicle 1 boards and exits a down escalator. The control device 100 may perform a control routine that is changed from the above routine into the one corresponding to a down escalator, as needed, according to differences between the up escalator and the down escalator.

For example, in step S102, the external detecting unit 112 of the control device 100 obtains image data of a down escalator, which is captured by use of the external sensor 4. Then, the external detecting unit 112 recognizes the down escalator through image recognition processing. Also, the operation performed in the boarding control mode (S108 and S110) is adapted to the down escalator, as will be explained below.

Figure 17:
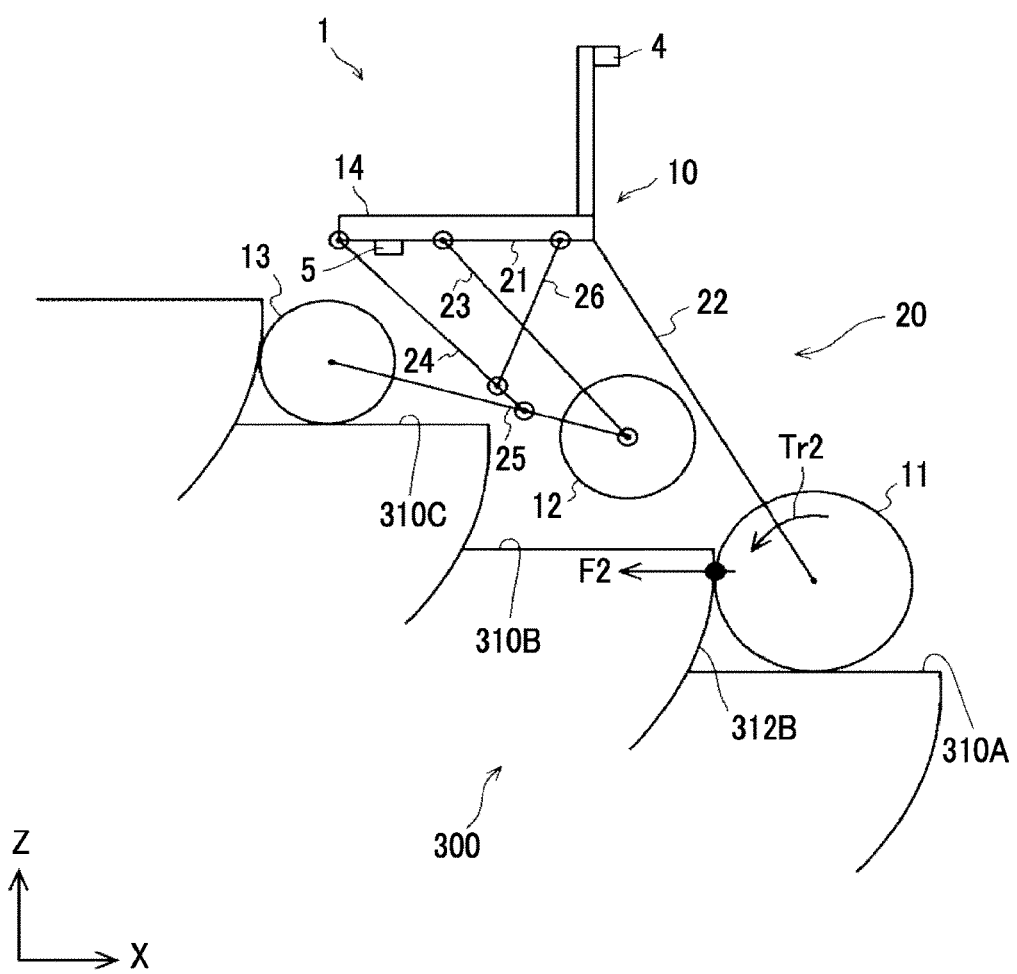
FIG. 17 is a view showing a condition in which the traveling vehicle according to the first embodiment is on board a down escalator.

FIG. 17 shows a condition in which the traveling vehicle 1 is on board a down escalator 300 according to the first embodiment. The boarding controller 124 controls the front-wheel drive motors 16, so as to rotate the front wheels 11 with a given constant torque, in a direction (reverse direction) opposite to the positive direction, namely, in a rotational direction in which the vehicle body 10 moves backward, as indicated by arrow Tr2 in FIG. 17. As a result, the front wheels 11 come into contact with a riser 312B between a tread 310A on which the front wheels 11 rides, and a tread 310B located immediately behind the tread 310A. If the front wheels 11 come into contact with the riser 312B, the front wheels 11 stop, in a condition where they are pressed against the riser 312B, as indicated by arrow F2 in FIG. 17. Thus, the vehicle body 10 descends, while stopping on the escalator 200.

Also, the boarding controller 124 drives the first linear motion mechanisms 22, second linear motion mechanisms 23, and the third linear motion mechanism 26, using a signal from the attitude angle sensor 5, so that the seat 14 lies in a substantially horizontal plane. More specifically, as shown in FIG. 17, the boarding controller 124 controls the respective linear motion mechanisms, so that the first linear motion mechanisms 22 become longer, the second linear motion mechanisms 23 become longer, and the third linear motion mechanism 26 becomes shorter, as compared with the time when the traveling vehicle 1 is traveling on a flat place (see FIG. 1 and FIG. 4). As a result, the front wheels 11 and the middle wheels 12 are located at lower levels than the rear wheels 13. Accordingly, the seat 14 can be placed in a substantially horizontal plane.

Regarding step S114, when the vehicle body 10 approaches a landing platform of the down escalator 300, the riser 312B against which the front wheels are pressed is retracted downward relative to the tread 310A. As a result, the front wheels 11 cease to contact with the riser 312B, and rotate in the same direction as arrow Tr2 in FIG. 17, due to torque indicated by arrow Tr2. At this time, as in the case of the up escalator 200, a value (measurement value) measured by each front-wheel rotation sensor 6 largely changes. When the amount of change of the measurement value (a condition of the drive wheel) of the front-wheel rotation sensor 6 exceeds a predetermined threshold value, the ejection determining unit 126 determines that the vehicle body 10 has approached the landing platform of the down escalator 300.

Next, a second embodiment will be described. A traveling vehicle 1 according to the second embodiment is different from that of the first embodiment in the routine for switching between the boarding control mode and the ejection control mode. In the other aspects of the configuration, the second embodiment is substantially identical with the first embodiment, and therefore, explanation will not be provided.

Figure 18:
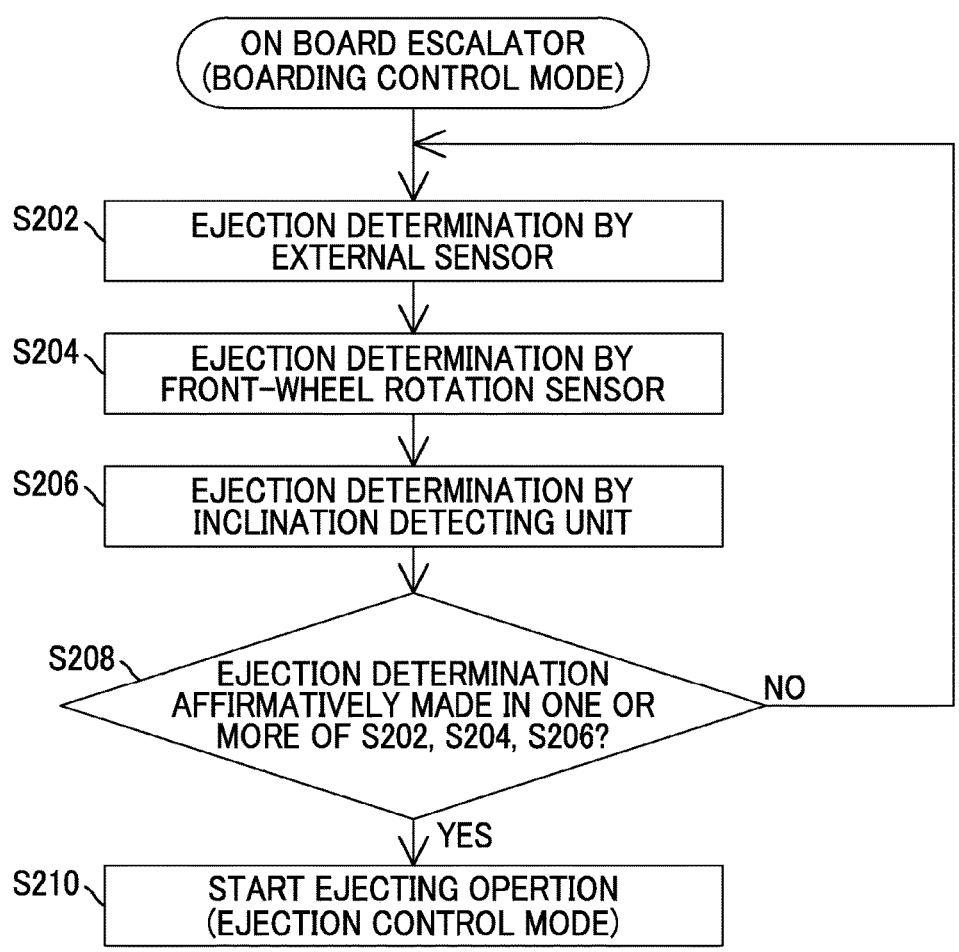
FIG. 18 is a flowchart illustrating the outline of a control routine for switching between the boarding control mode and the ejection control mode, which routine is performed by an ejection determining unit according to a second embodiment.

FIG. 18 is a flowchart illustrating the outline of a routine for switching between the boarding control mode and the ejection control mode, which routine is performed by the ejection determining unit 126 according to the second embodiment. Namely, FIG. 18 shows a method of controlling the traveling vehicle 1 according to the second embodiment. When the vehicle body 10 is on board the escalator, the ejection determining unit 126 makes an ejection determination by means of the external sensor 4 (step S202), similarly to step S12 of FIG. 7 and step S112 of FIG. 8. The ejection determining unit 126 also makes an ejection determination by means of the front-wheel rotation sensors 6 (step S204), similarly to step S14 of FIG. 7 and step S114 of FIG. 8. The ejection determining unit 126 also makes an ejection determination by means of the inclination detecting unit 118 (step S206), similarly to step S16 of FIG. 7 and step S116 of FIG. 8.

The ejection determining unit 126 determines whether an ejection determination is affirmatively made in one or more steps, out of steps S202, S204, and S206 (step S208). Namely, in the second embodiment, it is determined whether the ejection timing has been reached, in at least one (that is not necessarily more than half) of the three steps S202, S204 and S206. Then, if it is determined that the ejection timing has been reached in one or more steps (YES in step S208), the ejection determining unit 126 sends a command to start ejecting operation, to the ejection controller 128. As a result, the ejection controller 128 starts ejecting operation (step S210). Accordingly, the control mode is switched to the ejection control mode. On the other hand, if the number of steps in which it is determined that the ejection timing has been reached is less than one (NO in step S208), namely, if there is no step in which it is determined that the ejection timing has been reached, the ejection determining unit 126 does not switch the control mode to the ejection control mode. Then, the ejection determining unit 126 continues the boarding control mode, and the control returns to step S202.

Thus, in the second embodiment, the timing of ejection of the vehicle body 10 from the escalator is determined in three steps (S202, S204, S206), and the control mode is switched to the ejection control mode when it is determined in at least one step that the ejection timing has been reached. Namely, the operation to determine the ejection timing is made redundant. Accordingly, even when a determination cannot be correctly made in one or more steps, out of the three steps, the ejection timing can be determined, using the result of determination correctly made in even one step. Namely, even when an abnormality occurs to one or more of the sensors (detectors) used in the three steps, the vehicle body 10 can eject from the escalator in appropriate timing.

Further, as in the case of the first embodiment, in the second embodiment, too, the sensors used in the above three steps are not dedicated sensors provided solely for determining the timing of ejection from the escalator, but are general sensors used for normal operation of the traveling vehicle 1. Accordingly, the traveling vehicle 1 according to the second embodiment is able to eject from the escalator even in the case where an abnormality occurs to one or more sensors (detector(s)), without additionally installing a dedicated sensor(s) for detecting the timing of ejection from the escalator.

When it is determined in one of the three steps that "the ejection timing has been reached", it may be unclear or unknown whether an abnormality occurs to the sensor (detector) involved in the one step. In this case, if an abnormality occurs to the sensor involved in this step, the determination that "the ejection timing has been reached" in the step is wrong. Accordingly, even when it is not determined in the other two steps (using normal sensors) that "the ejection timing has been reached" (namely, when the ejection timing is not actually reached), the control mode may be undesirably switched to the ejection control mode. Accordingly, with the ejection determining unit 126 configured to switch the control mode to the ejection control mode when it is determined in more than half of the three steps that the ejection timing has been reached, as in the first embodiment, it is possible to eject the traveling vehicle 1 from the escalator in the more appropriate timing, as compared with the case of the second embodiment, While the ejection determination is made in the three steps (S202, S204 and S206) in the second embodiment, the control device 100 is not limited to this configuration. In the second embodiment, the ejection determination may be made in two steps. In this case, one of the steps S202, S204 and S206 may not be executed. Also, the sensor involved in the step that is not executed is not necessarily provided, if it is not needed for control of normal operation of the vehicle body 10. The order of execution of steps S202-S206 is not limited to the order shown in FIG. 18. Also, steps S202-206 may be executed in parallel.

Next, a third embodiment will be described. A traveling vehicle 1 according to the third embodiment is different from those of the other embodiments in the arrangement of sensors (detectors). The other hardware configuration of the third embodiment is substantially identical with those of the other embodiments, and therefore, explanation will not be provided.

Figure 19:
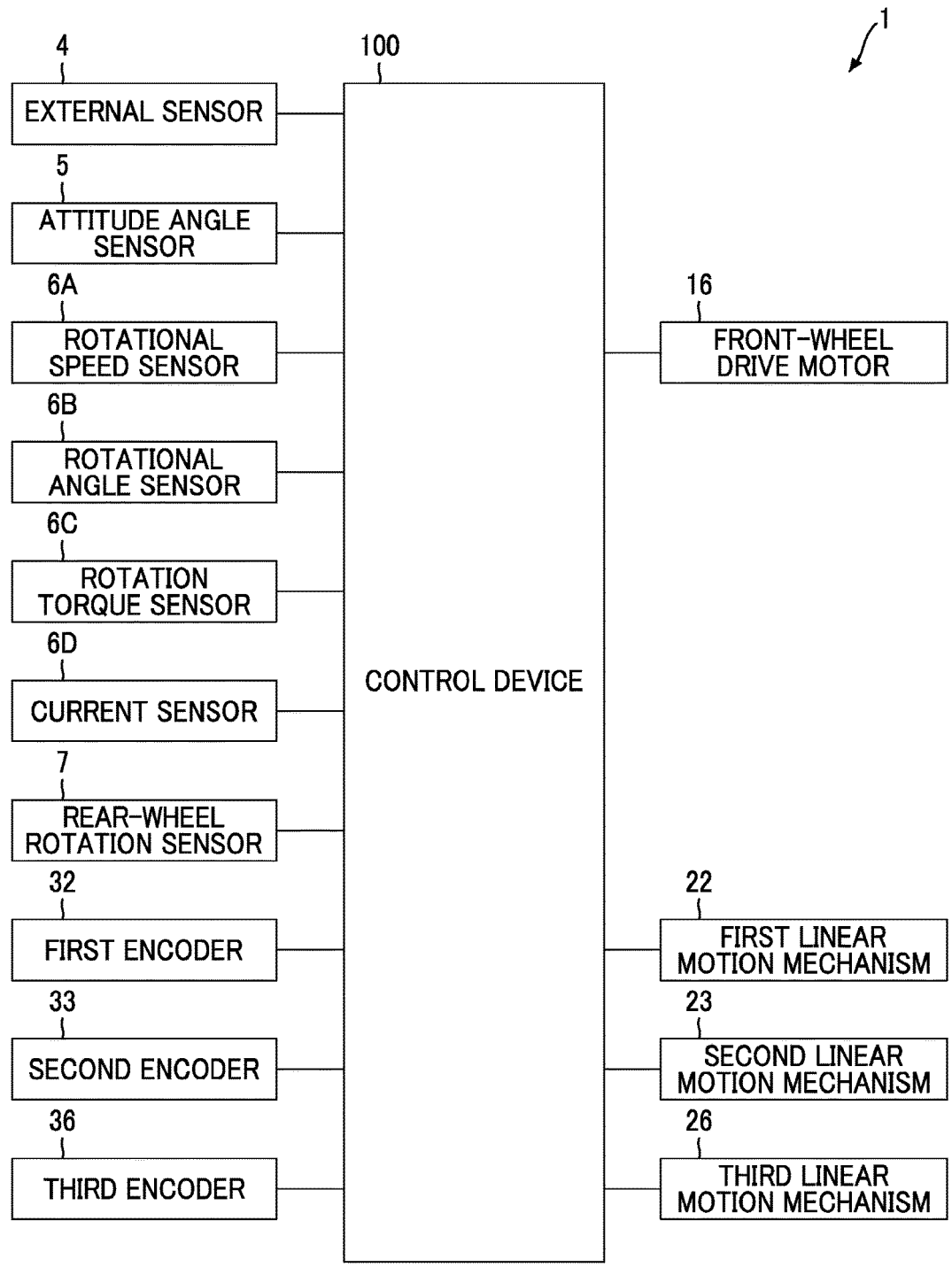
FIG. 19 is a block diagram showing the hardware configuration of a traveling vehicle according to a third embodiment.

FIG. 19 is a block diagram showing the hardware configuration of the traveling vehicle 1 according to the third embodiment. Like the traveling vehicle 1 according to the first embodiment, the traveling vehicle 1 according to the third embodiment has the external sensor 4, attitude angle sensor 5, front-wheel drive motors 16, rear-wheel rotation sensors 7, first linear motion mechanisms 22, second linear motion mechanisms 23, third linear motion mechanism 26, first encoders 32, second encoders 33, and the third encoder 36. Further, the traveling vehicle 1 according to the third embodiment has rotational speed sensors 6A, rotational angle sensors 6B, rotation torque sensors 6C, and current sensors 6D. The rotational speed sensor 6A, rotational angle sensor 6B, rotation torque sensor 6C and the current sensor 6D are specific examples of the front-wheel rotation sensor 6, and function as detecting means for detecting conditions of the front wheel 11 as a drive wheel. Namely, the traveling vehicle 1 according to the third embodiment has a plurality of sensors (detectors) that are different from each other in the type of a condition (condition of the front wheel 11 as a drive wheel) to be detected.

The rotational speed sensor 6A detects the rotational speed of each of the front wheels 11. The rotational angle sensor 6B detects the rotational angle of the front wheel 11. The rotation torque sensor 6C detects the torque of the front-wheel drive motor 16 (or the front wheel 11). The current sensor 6D detects a current value associated with the front-wheel drive motor 16. The current sensor 6D detects a value of current used for control of the front-wheel drive motor 16. The current value detected by the current sensor 6D may be, for example, a current value indicating an actual torque value of the motor, a current value indicating a target torque value of the motor, or a current value indicating the number of revolutions (rotational speed) of the motor.

Figure 20:
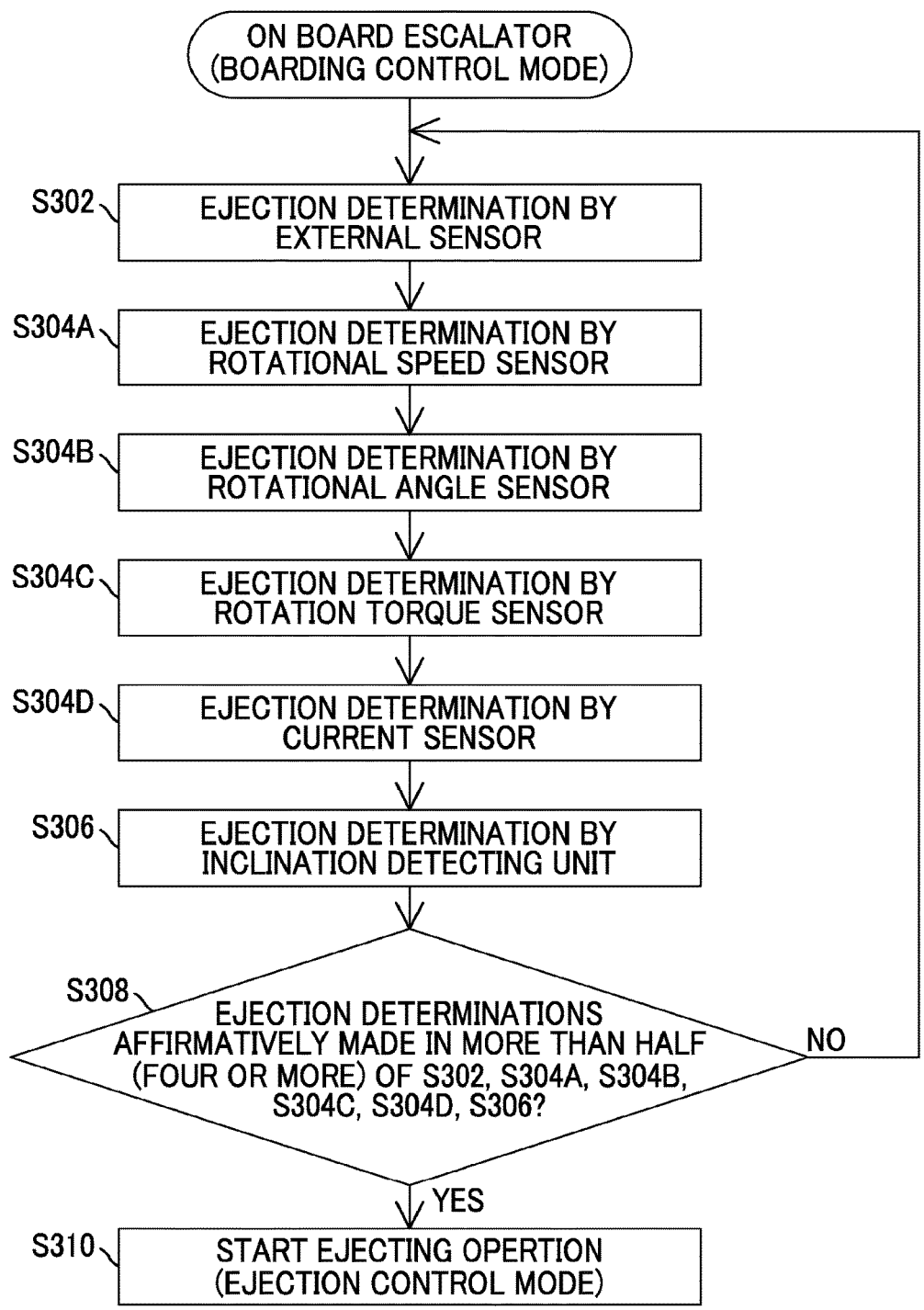
FIG. 20 is a flowchart illustrating the outline of a control routine for switching between the boarding control mode and the ejection control mode, which routine is performed by an ejection determining unit according to the third embodiment.

FIG. 20 is a flowchart illustrating the outline of a routine for switching between the boarding control mode and the ejection control mode, which routine is performed by an ejection determining unit 126 according to the third embodiment. Namely, FIG. 20 shows a method of controlling the traveling vehicle 1 according to the third embodiment. When the vehicle body 10 is on board the escalator, the ejection determining unit 126 makes an ejection determination by means of the external sensor 4 (step S302), as in step S12 of FIG. 17.

The ejection determining unit 126 makes an ejection determination by means of the rotational speed sensors 6A (step S304A). More specifically, when the vehicle body 10 approaches the landing platform 203, as shown in FIG. 13, the riser 212F against which the front wheels 11 are pressed is retracted relative to the tread 210A. As a result, the front wheels 11 rotate in the positive direction. At this time, the rotational speed measured by each rotational speed sensor 6A largely increases. Accordingly, when the amount of change of the rotational speed of the front wheel 11 exceeds a predetermined threshold value, the ejection determining unit 126 determines in step S304A that the ejection timing is reached.

The ejection determining unit 126 makes an ejection determination by means of the rotational angle sensors 6B (step S304B). More specifically, when the vehicle body 10 approaches the landing platform 203, as shown in FIG. 13, the riser 212F against which the front wheels 11 are pressed is retracted relative to the tread 210A. As a result, the front wheels 11 rotate in the positive direction. At this time, the rotational angle measured by each rotational angle sensor 6B largely changes. Accordingly, when the amount of change of the rotational angle of the front wheel 11 exceeds a predetermined threshold value, the ejection determining unit 126 determines in step S304B that the ejection timing is reached.

The ejection determining unit 126 makes an ejection determination by means of the rotation torque sensors 6C (step S304C). More specifically, when the vehicle body 10 approaches the landing platform 203, as shown in FIG. 13, the riser 212F against which the front wheels 11 are pressed is retracted relative to the tread 210A. At this time, since each front-wheel drive motor 16 is controlled through torque control, the rotational speed of the front wheel 11 may momentarily exceed a predetermined upper-limit value. Accordingly, the controller 120 reduces a control value (target value) of torque so that the rotational speed does not exceed the upper-limit value, and the amount of change (amount of reduction) of the torque value may exceed a threshold value. Accordingly, in this case, the ejection determining unit 126 determines in step S304C that the ejection timing is reached.

The ejection determining unit 126 makes an ejection determination by means of the current sensors 6D (step S304C). More specifically, when the vehicle body 10 approaches the landing platform 203, as shown in FIG. 13, the riser 212F against which the front wheels 11 are pressed is retracted relative to the tread 210A. Accordingly, as described above, the control amount (the torque value or the number of revolutions, for example) of each front-wheel drive motor 16 changes. Accordingly, a current value associated with the front-wheel drive motor 16 changes. Thus, when the amount of change of the current value exceeds a predetermined threshold value, the ejection determining unit 126 determines in step S304D that the ejection timing is reached.

As in step S16 of FIG. 7, etc., the ejection determining unit 126 makes an ejection determination by means of the inclination detecting unit 118 (step S306). The ejection determining unit 126 determines whether the ejection determination is affirmatively made in more than half (namely, four or more) of the six steps S302, S304A-S304D, and S306 (step S308). Then, if it is determined in more than half of the steps that the ejection timing is reached (YES in step S308), the ejection determining unit 126 sends a command to start ejecting operation, to the ejection controller 128. As a result, the ejection controller 128 starts ejecting operation (step S310). Accordingly, the control mode is switched to the ejection control mode. On the other hand, if the number of steps in which it is determined that the ejection timing is reached is not more than half of the above-indicated steps (NO in step S308), the ejection determining unit 126 continues the boarding control mode, without switching the control mode to the ejection control mode, and the control returns to step S302.

Thus, in the third embodiment, the timing of ejection of the vehicle body 10 from the escalator is determined in six steps (S302, S304A-S304D, and S306), and the control mode is switched to the ejection control mode when it is determined in a part of the steps that the ejection timing is reached. Namely, the operation to determine the ejection timing is made redundant. Accordingly, even if a determination cannot be correctly made in one or more of the six steps, the ejection timing can be determined using the remaining steps. Namely, even when an abnormality occurs to one or more of the sensors (detectors) used in the six steps, the vehicle body 10 can eject from the escalator in appropriate timing.

Further, in the third embodiment, too, the sensors used in the above six steps are not dedicated sensors provided solely for determining the timing of ejection from the escalator, but are general sensors used for normal operation of the traveling vehicle 1, as in the other embodiments. Accordingly, the traveling vehicle 1 according to the third embodiment is able to eject from the escalator even in the case where an abnormality occurs to one or more sensors (detector(s)), without additionally installing a dedicated sensor(s) for detecting the timing of ejection from the escalator.

Further, in the third embodiment, when it is determined in more than half of the six steps that the ejection timing is reached, the control mode is switched to the ejection control mode, as in the first embodiment. Accordingly, even when abnormalities occur to sensors involved in two steps, for example, and it is erroneously determined in the two steps that the ejection timing is reached, it is not determined in the other steps that the ejection timing is reached, if sensors involved in the other four steps are normal. In this case, the control mode is not switched to the ejection control mode. Conversely, when it is normally determined in four steps using normal sensors that the ejection timing is reached, the control mode is appropriately switched to the ejection control mode, even if it is not determined in two steps using abnormal sensors that the ejection timing is reached. Accordingly, the traveling vehicle 1 according to the third embodiment is able to more appropriately eject from the escalator, even when an abnormality occurs to any of the plurality of sensors (detectors).

Even when a large number of sensors are used for making an ejection determination, as in the third embodiment, and abnormalities occur to two or more sensors, the traveling vehicle 1 is able to appropriately eject from the escalator, if the sensors involved in more than half of the above-indicated steps are normal. Accordingly, the traveling vehicle 1 according to the third embodiment has enhanced robustness over abnormalities of sensors, as compared with the traveling vehicle 1 according to the first embodiment.

This disclosure is not limited to the above-described embodiments, but the embodiments may be changed as needed without departing from the principle of the disclosure. For example, the types of sensors used for ejection determination are not limited to those as described above. Also, the types of the front-wheel rotation sensors 6 are not limited to those as listed in the above embodiments, but various sensors may be considered.

Also, the above-described embodiments can be applied to each other. For example, the third embodiment may be applied to the first embodiment. In this case, the ejection determining unit 126 may make ejection determinations in only three steps, out of the six steps (S302, S304A-S304D, and S306) of making ejection determinations in the third embodiment, and the ejection determining unit 126 may switch the control mode to the ejection control mode, when it is determined in more than half (two or more) of these steps that the ejection timing is reached. Namely, there is no need to execute all of the steps S302, S304A-S304D, and S306. At this time, ejection determinations may be made in three steps (e.g., S304A, S304B and S304D) involving the front-wheel rotation sensors 6. In this case, sensors (such as the external sensor 4) involved in the other ejection determining steps may not be provided. Further, the ejection determining unit 126 may make ejection determinations in four or five steps, out of the six ejection determining steps (S302, S304A-S304D, and S306) according to the third embodiment, and may switch the control mode to the ejection control mode, when it is determined in more than half (three or more) of these four or five steps that the ejection timing is reached.

For example, the ejection determining unit 126 may make ejection determinations in steps S302, S304A and S304B, and may switch the control mode to the ejection control mode, when it is determined in more than half of these steps that the ejection timing is reached. Also, the ejection determining unit 126 may make ejection determinations in steps S304C, 304D and S306, for example, and may switch the control mode to the ejection control mode, when it is determined in more than half of these steps that the ejection timing is reached. Also, the ejection determining unit 126 may make ejection determinations in steps S302, S304A, S304B and S304C, for example, and may switch the control mode to the ejection control mode, when it is determined in more than half of these steps that the ejection timing is reached.

Similarly, the third embodiment maybe applied to the second embodiment. In this case, the ejection determining unit 126 may make ejection determinations in any two or more steps, out of the ejection determining steps (S302, S304A-S304D, and S306) according to the third embodiment, and may switch the control mode to the ejection control mode, when it is determined in at least one of these steps that the ejection timing is reached. At this time, ejection determinations may be made in two or more steps (e.g., S304A and S304C) involving the front-wheel rotation sensors 6. In this case, sensors (such as the external sensor 4) involved in the other ejection determining steps may not be provided.

For example, the ejection determining unit 126 may make ejection determinations in steps S302, S304A and S304B, and may switch the control mode to the ejection control mode, when it is determined in at least one of these steps that the ejection timing is reached. Also, the ejection determining unit 126 may make ejection determinations in steps S304C, S304D and S306, for example, and may switch the control mode to the ejection control mode, when it is determined in at least one of these steps that the ejection timing is reached. Also, the ejection determining unit 126 may make ejection determinations in steps S302, S304A, S304B and S304C, for example, and may switch the control mode to the ejection control mode, when it is determined in at least one of these steps that the ejection timing is reached.

If the front wheels 11 are strongly pressed against the riser 212 in the boarding control mode, the front wheels 11 may suddenly step forward when the riser 212 is retracted. Accordingly, it is desirable that the torque value of the front-wheel drive motors 16 in the boarding control mode is not too large. On the other hand, if the target value of torque is thus reduced, the response of ejection determining operation using the front-wheel rotation sensors 6 is reduced. Accordingly, if ejection determinations are made using only the sensors (rotational speed sensors 6A, rotational velocity sensors 6B, rotation torque sensors 6C and current sensors 6D) as the front-wheel rotation sensors 6, an erroneous determination may be made even if no abnormality occurs to the sensors, depending on the responses of the above-indicated sensors. Accordingly, it is preferable to make an ejection determination, using a combination of the front-wheel rotation sensors 6 and other sensors (external sensor 4, attitude angle sensor 5, first encoders 32, second encoders 33, and third encoder 36). Thus, the reliability with which the timing of ejection from the escalator is determined can be improved.

Also, tasks performed by respective constituent elements of the control device 100 may be performed by other constituent elements. For example, a part of the tasks of the inclination detecting unit 118 may be performed by the ejection determining unit 126. Also, a part of the tasks of the external detecting unit 112 may be performed by the ejection determining unit 126.

In the above-described embodiments, the control device 100 is physically integral with the vehicle body 10, but the disclosure is not limited to this arrangement. The control device 100 may not be integral with the vehicle body 10, but may be physically separate from the vehicle body 10. In this case, the control device 100 may be wirelessly connected to each sensor, motor, and actuator of the vehicle body 10, and may remotely operate the vehicle body 10. Further, each sensor (detector) need not be physically integral with the vehicle body 10.

While it is assumed that a person rides on the traveling vehicle 1 according to the above embodiments, the traveling vehicle 1 is not limited to this application. The traveling vehicle 1 may be a vehicle on which a person does not board. For example, the traveling vehicle 1 according to the embodiments may be used as an unmanned delivery or transporter vehicle, for example.

While the traveling vehicle 1 according to the above embodiments performs control so that the seat 14 lies in a substantially horizontal plane, the disclosure is not limited to this arrangement. The traveling vehicle 1 does not need to perform control so as to make the seat 14 horizontal. In this case, the variable mechanism 20 is not needed. Also, in this case, the inclination of the escalator can be detected by using the attitude angle sensor 5. Namely, the attitude angle sensor 5 functions as a detecting means for detecting the inclination of the escalator.

While the front wheels 11 are drive wheels in the traveling vehicle 1 according to the above embodiments, the rear wheels 13 may be drive wheels. In this case, the motors and sensors associated with the front wheels 11 may be provided on the rear wheels 13 side. Also, the traveling vehicle 1 may not have the middle wheels 12. Also, the traveling vehicle 1 may be equipped with brakes for stopping rotation of at least one pair of the front wheels 11 and the rear wheels 13. Also, the traveling vehicle 1 may be equipped with steering. When the front wheels 11 are drive wheels, as in the above embodiments, the rear-wheel rotation sensors 7 are not necessarily provided).

What is claimed is:

1. A traveling vehicle capable of riding on an escalator, comprising:

a vehicle body having a drive wheel;

a controller that controls movement of the vehicle body; and at least two of at least one first detecting device, a second detecting device, and a third detecting device, which are used when the controller controls movement of the vehicle body, or a plurality of types of first detecting devices as said at least one first detecting device configured to detect different conditions of the drive wheel, said at least one first detecting device being configured to detect a condition of the drive wheel, the second detecting device being configured to detect a condition surrounding the vehicle body, the third detecting device being configured to detect an inclination angle when the vehicle body is located at a place having a height difference, the inclination angle corresponding to the height difference, wherein the controller is able to switch a control mode between a first control mode in which the drive wheel is controlled so as to be pressed against a riser of the escalator when the drive wheel rides on a tread of the escalator, and a second control mode in which the drive wheel is controlled so as to eject the vehicle body from the escalator, the controller uses at least two determinations of at least one first determination, a second determination, and a third determination, or at least two first determinations as said at least one first determination, as ejection determinations on ejection from the escalator, said at least one first determination being made by using said at least one first detecting device and determining that an amount of change of the condition of the drive wheel exceeds a predetermined amount of change, as the vehicle body approaches a landing platform of the escalator, and the riser is retracted relative to the tread, in a condition where the drive wheel rides on the tread in the first control mode, the second determination being made by using the second detecting device and determining that the vehicle body approaches the landing platform of the escalator, in the condition where the drive wheel rides on the tread in the first control mode, the third determination being made by using the third detecting device and determining that an inclination angle of the escalator becomes smaller than a predetermined inclination angle as the vehicle body approaches the landing platform of the escalator, in the condition where the drive wheel rides on the tread in the first control mode, and the controller is configured to switch the control mode from the first control mode to the second control mode for control of the drive wheel, when any of at least two ejection determinations as the ejection determinations is affirmatively made, and it is determined that timing of ejection of the vehicle body from the escalator is reached.

2. The traveling vehicle according to claim 1, wherein
the controller uses at least three of a plurality of first determinations as said at least one first determination, which are made by using a plurality of first detecting devices as said at least one first detecting device, or at least three of said at least one first determination, the second determination, and the third determination, as the ejection determinations on ejection from the escalator, and the controller is configured to switch the control mode from the first control mode to the second control mode for control of the drive wheel, when more than half of said at least three ejection determinations are affirmatively made, and it is determined that the timing of ejection of the vehicle body from the escalator is reached.

3. The traveling vehicle according to claim 1, wherein
the controller uses at least two of the first determination, the second determination, and the third determination, as the ejection determinations on ejection from the escalator; and the controller is configured to switch the control mode from the first control mode to the second control mode for control of the drive wheel, when any of at least two ejection determinations as the ejection determinations are affirmatively made, and it is determined that the timing of ejection of the vehicle body from the escalator is reached.

4. A method of controlling a traveling vehicle capable of riding on an escalator, the traveling vehicle including a vehicle body having a drive wheel, and at least two of at least one first detecting device, a second detecting device, and a third detecting device, which are used for controlling movement of the vehicle body, or a plurality of first detecting devices as said at least one first detecting device configured to detect different conditions of the drive wheel, said at least one first detecting device being configured to detect a condition of the drive wheel, the second detecting device being configured to detect a condition surrounding the vehicle body, the third detecting device being configured to detect an inclination angle when the vehicle body is located at a place having a height difference, the inclination angle corresponding to the height difference, the traveling vehicle being switchable between a first control mode in which the drive wheel is controlled so as to be pressed against a riser of the escalator when the drive wheel rides on a tread of the escalator, and a second control mode in which the drive wheel is controlled so as to eject the vehicle body from the escalator, the method comprising:

using at least two determinations of at least one first determination, a second determination, and a third determination, or at least two first determinations as said at least one first determination, as ejection determinations on ejection from the escalator, said at least one first determination being made by using said at least one first detecting device and determining that an amount of change of the condition of the drive wheel exceeds a predetermined amount of change, as the vehicle body approaches a landing platform of the escalator, and the riser is retracted relative to the tread, in a condition where the drive wheel rides on the tread in the first control mode, the second determination being made by using the second detecting device and determining that the vehicle body approaches the landing platform of the escalator, in the condition where the drive wheel rides on the tread in the first control mode, the third determination being made by using the third detecting device and determining that an inclination angle of the escalator becomes smaller than a predetermined inclination angle as the vehicle body approaches the landing platform of the escalator, in the condition where the drive wheel rides on the tread in the first control mode, and switching the traveling vehicle from the first control mode to the second control mode for control of the drive wheel, when any of at least two ejection determinations as the ejection determinations is affirmatively made, and it is determined that timing of ejection of the vehicle body from the escalator is reached.

* * * * *